United States Patent
Zhang et al.

(10) Patent No.: US 12,412,514 B2
(45) Date of Patent: Sep. 9, 2025

(54) INTELLIGENT INTERACTIVE TABLET AND BRIGHTNESS ADJUSTMENT METHOD THEREOF

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Yangyang Zhang, Beijing (CN); Xinxin Mu, Beijing (CN); Zifeng Wang, Beijing (CN); Sijia Guo, Beijing (CN); Yongda Ma, Beijing (CN); Honglei Zhang, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/573,302

(22) PCT Filed: Jun. 25, 2021

(86) PCT No.: PCT/CN2021/102351
§ 371 (c)(1),
(2) Date: Dec. 21, 2023

(87) PCT Pub. No.: WO2022/266998
PCT Pub. Date: Dec. 29, 2022

(65) Prior Publication Data
US 2024/0312397 A1    Sep. 19, 2024

(51) Int. Cl.
*G09G 3/32* (2016.01)
*G06F 3/04817* (2022.01)
(Continued)

(52) U.S. Cl.
CPC .......... *G09G 3/32* (2013.01); *G06F 3/04817* (2013.01); *G06F 3/04883* (2013.01);
(Continued)

(58) Field of Classification Search
None
See application file for complete search history.

(56) References Cited

U.S. PATENT DOCUMENTS 5,634,018 A * 5/1997 Tanikoshi ............... G06F 3/033
715/756
6,326,954 B1 * 12/2001 Van Ieperen ....... G06F 3/04883
345/173
(Continued)

FOREIGN PATENT DOCUMENTS

| CN | 107885435 A | 4/2018 |
|---|---|---|
| CN | 111414114 A | 7/2020 |
| CN | 111880678 A | 11/2020 |

OTHER PUBLICATIONS

Translation of drawings and Applicant's provided translation of CN111414114 published year 2020 (Year: 2020).*

*Primary Examiner* — Dorothy Harris
(74) *Attorney, Agent, or Firm* — BROOKS KUSHMAN P.C.

(57) ABSTRACT

An intelligent interactive tablet and brightness adjustment method. The first region receives touch operation instructions from a user, it is able to reduce the brightness of the first region when the user operates the intelligent interactive tablet at a short distance, so as to facilitate the user to interact more comfortably and improve user's experience. A display screen, a touch component and a driving circuit are included, a first region and a second region are determined in a display region of the display screen, a position of the first region does not overlap that of the second region, the first region includes at least a part of contents in the display region, and
(Continued)

the first region is configured to receive the touch operation instruction from the user; and a display brightness of the first region is controlled to be lower than that of the second region.

19 Claims, 10 Drawing Sheets

(51) Int. Cl.
  *G06F 3/0484* (2022.01)
  *G06F 3/04883* (2022.01)
(52) U.S. Cl.
  CPC ... *G06F 3/0484* (2013.01); *G09G 2320/0626* (2013.01); *G09G 2320/0686* (2013.01); *G09G 2354/00* (2013.01)

(56) References Cited

U.S. PATENT DOCUMENTS

| | | | | |
|---|---|---|---|---|
| 6,564,246 B1* | 5/2003 | Varma | | G06Q 10/10 709/248 |
| 6,774,900 B1* | 8/2004 | Kubota | | A63F 13/56 345/473 |
| 7,213,211 B1* | 5/2007 | Sanders | | G09B 5/08 715/755 |
| 2001/0035976 A1* | 11/2001 | Poon | | H04N 1/00244 358/1.15 |
| 2003/0227479 A1* | 12/2003 | Mizrahi | | G06Q 30/02 715/753 |
| 2004/0070616 A1* | 4/2004 | Hildebrandt | | G06F 21/84 715/764 |
| 2007/0146344 A1* | 6/2007 | Martin | | G09G 5/00 345/173 |
| 2009/0256814 A1* | 10/2009 | Chung | | G06F 3/041 345/173 |
| 2010/0295877 A1* | 11/2010 | Yun | | G09G 3/3406 345/102 |
| 2011/0107222 A1* | 5/2011 | Uchida | | H04N 21/42202 715/730 |
| 2012/0072843 A1* | 3/2012 | Durham | | G06F 3/041 715/733 |
| 2015/0301670 A1* | 10/2015 | Chiu | | G06F 3/0487 345/589 |
| 2017/0045936 A1* | 2/2017 | Kakapuri | | G06F 3/04847 |
| 2018/0040296 A1* | 2/2018 | Zhan | | G06F 3/0416 |
| 2018/0277008 A1* | 9/2018 | Kojo | | G09B 5/14 |
| 2019/0346954 A1 | 11/2019 | Jung et al. | | |
| 2020/0387301 A1* | 12/2020 | Yuk | | G06F 3/04883 |
| 2021/0060998 A1* | 3/2021 | Zuo | | G02F 1/13338 |
| 2022/0083215 A1* | 3/2022 | Xia | | G06F 3/04842 |
| 2022/0121354 A1* | 4/2022 | Xia | | G06F 3/04847 |

* cited by examiner second
region

INTELLIGENT INTERACTIVE TABLET AND BRIGHTNESS ADJUSTMENT METHOD THEREOF

CROSS-REFERENCE TO RELATED APPLICATION

This application is the U.S. national phase of PCT Application No. PCT/CN2021/102351 filed on Jun. 25, 2021, which is incorporated herein by reference in its entirety.

TECHNICAL FIELD

The present disclosure relates to the field of light-emitting diode (LED) screen control technology, in particular to an intelligent interactive tablet and a method for adjusting brightness of the intelligent interactive tablet.

BACKGROUND

Commercial display screen has such product characteristics as high brightness and diversified splicing sizes, and occupies an important position in display product market. Compared with general display products, a size of the commercial display screen is not limited. At present, the maximum size of the commercial display screen is 110 inches, and it may be spliced indefinitely in theory.

At present, intelligent interactive tablets ranging from 135 inches to 165 inches are emerging for indoor display products. With the development of the technology, touch components are added to the intelligent interactive tablets to achieve touch function and other functions. In the process of using, there is a need to increase the brightness of the display screen due to the large number of viewers. However, when users need to control or write at a short distance, the high brightness display mode of the display screen easily causes visual fatigue and is very dazzling, resulting in poor user's experience.

SUMMARY

In one aspect, the present disclosure provides in some embodiments an intelligent interactive tablet, including a display screen, a touch component and a driving circuit. The display screen is configured to display contents; the touch component is configured to receive a touch operation instruction; and the driving circuit includes a processor and a memory, the memory is configured to store a program executable by the processor, and the processor is configured to read the program stored in the memory and execute the following steps: determining a first region and a second region in a display region of the display screen, wherein a position of the first region does not overlap a position of the second region, contents displayed in the first region include at least a part of contents in the display region, and the first region is configured to receive the touch operation instruction from a user; and controlling a display brightness of the first region to be lower than a display brightness of the second region.

In a possible embodiment of the present disclosure, the processor is further configured to execute: receiving a touch operation instruction for the first region; and converting the touch operation instruction for the first region into a touch operation instruction for controlling the second region.

In a possible embodiment of the present disclosure, the contents displayed in the first region include contents in the second region.

In a possible embodiment of the present disclosure, the processor is specifically configured to execute: displaying a first icon in the second region; displaying a second icon associated with the first icon in the first region; receiving a first touch operation instruction for the second icon in the first region; and converting the first touch operation instruction for the second icon in the first region into a second touch operation instruction for controlling the first icon in the second region.

In a possible embodiment of the present disclosure, the processor is further specifically configured to execute: copying at least a part of the contents in the first region to the second region for display.

In a possible embodiment of the present disclosure, the processor is specifically configured to execute: receiving a writing instruction from the first region, and generating handwriting in the first region in accordance with the writing instruction; and copying the handwriting generated in the first region to the second region for display.

In a possible embodiment of the present disclosure, subsequent to copying at least a part of the contents in the first region to the second region for display, the processor is further specifically configured to execute: determining that the writing instruction from the first region is ended, and removing contents of the copied handwriting in the first region from the second region.

In a possible embodiment of the present disclosure, the second region is a remaining region in the display region except the first region; or the second region is a part of the remaining region in the display region except the first region.

In a possible embodiment of the present disclosure, the processor is further specifically configured to execute: copying the at least a part of the contents in the display region to the second region for display.

In a possible embodiment of the present disclosure, the display brightness of the second region is greater than a display brightness of other regions in the display region.

In a possible embodiment of the present disclosure, the display region further includes a third region, the display brightness of the second region is greater than a display brightness of the third region, and the display brightness of the third region is greater than the display brightness of the first region.

In a possible embodiment of the present disclosure, subsequent to controlling the display brightness of the first region to be lower than the display brightness of the second region, the processor is further specifically configured to execute: adjusting the display brightness of the first region to a preset brightness after determining that an operation in the first region is ended for a preset period; or adjusting the display brightness of the first region to a display brightness of a previous display preset period after determining that an operation in the first region is ended for a preset period; or adjusting the display brightness of the first region to be the same as the display brightness of the second region after determining that an operation in the first region is ended for a preset period.

In a possible embodiment of the present disclosure, prior to determining the first region and the second region in the display region of the display screen, the processor is further specifically configured to execute: receiving a control instruction to reduce a display brightness of a full screen of the display screen; and the controlling the display brightness of the first region to be lower than the display brightness of the second region, includes receiving the touch operation instruction for the first region to increase the display brightness of the second region.

In a possible embodiment of the present disclosure, the processor is specifically configured to execute: determining the first region in accordance with a predetermined position of the first region; or determining the first region corresponding to a control instruction in accordance with the received control instruction.

In a possible embodiment of the present disclosure, the processor is specifically configured to execute: if the control instruction is a received touch operation instruction for controlling the first region, determining the first region in accordance with a position of the touch operation instruction in the display region; or if the control instruction is an instruction for detecting a human body position, determining the first region in accordance with the human body position.

In a possible embodiment of the present disclosure, the display brightness of the first region decreases as a distance between the human body position and the intelligent interactive tablet decreases.

In a possible embodiment of the present disclosure, the processor is specifically configured to execute: if the distance between the human body position and the intelligent interactive tablet is greater than an operation threshold and less than a viewing threshold, determining the display brightness of the first region to be a first level brightness, and the operation threshold being less than the viewing threshold; and if the distance between the human body position and the intelligent interactive tablet is less than or equal to the operation threshold, controlling the display brightness of the first region to be lower than the first level brightness.

In a possible embodiment of the present disclosure, an area of the first region decreases as the distance between the human body position and the intelligent interactive tablet decreases.

In a possible embodiment of the present disclosure, the processor is specifically configured to execute: if the touch operation instruction is a click operation instruction, obtaining a time difference between adjacent click operation instructions, and if the time difference is less than a continuous click threshold, determining the first region in accordance with a position of a latest received click operation instruction in the display region; or if the touch operation instruction is the writing instruction, determining the first region in accordance with a position of the writing instruction in the display region.

In a possible embodiment of the present disclosure, the processor is specifically configured to execute: determining a region within a preset range as the first region with the position of the touch operation instruction in the display region as a center; or determining a circular region with a radius of view as a radius as the first region with the position of the touch operation instruction in the display region as a center, and the radius of view being determined in accordance with a distance between the user sending the touch operation instruction and the intelligent interactive tablet.

In a possible embodiment of the present disclosure, the processor is specifically configured to execute: determining a center of a region corresponding to the human body position in the display region in accordance with the human body position, and determining the first region in accordance with the center of the region.

In a possible embodiment of the present disclosure, the processor is specifically configured to execute: determining the second region in accordance with a predetermined position of the second region; or determining the second region corresponding to a control instruction in accordance with the received control instruction; or determining the second region corresponding to the first region in accordance with the first region.

In a possible embodiment of the present disclosure, the control instruction includes at least one of the following: the touch operation instruction; an instruction for a proximity sensor; an instruction for a distance sensor; an instruction for a Bluetooth receiver; an instruction for a hotspot receiver; an instruction for a WI-FI receiver; and an instruction for a peripheral device in communication connection with the intelligent interactive tablet.

In another aspect, the present disclosure provides in some embodiments a method for adjusting a brightness of an intelligent interactive tablet, including: determining a first region and a second region in a display region of a display screen, wherein a position of the first region does not overlap a position of the second region, the first region includes at least a part of contents in the display region, and the first region is configured to receive a touch operation instruction from a user; and controlling a display brightness of the first region to be lower than a display brightness of the second region.

In a possible embodiment of the present disclosure, the method further includes receiving a touch operation instruction for the first region; and converting the touch operation instruction for the first region into a touch operation instruction for controlling the second region.

In a possible embodiment of the present disclosure, contents displayed in the first region include contents in the second region.

In a possible embodiment of the present disclosure, the receiving a touch operation instruction for the first region and converting the touch operation instruction for the first region into a touch operation instruction for controlling the second region, includes displaying a first icon in the second region; displaying a second icon associated with the first icon in the first region; receiving a first touch operation instruction for the second icon in the first region; and converting the first touch operation instruction for the second icon in the first region into a second touch operation instruction for controlling the first icon in the second region.

In a possible embodiment of the present disclosure, subsequent to determining the first region and the second region in the display region of the display screen, the method further includes: copying at least a part of the contents in the first region to the second region for display.

In a possible embodiment of the present disclosure, the copying at least a part of the contents in the first region to the second region for display, includes receiving a writing instruction from the first region, and generating handwriting in the first region in accordance with the writing instruction; and copying the handwriting generated in the first region to the second region for display.

In a possible embodiment of the present disclosure, subsequent to copying at least a part of the contents in the first region to the second region for display, the method further includes determining that the writing instruction from the first region is ended, and removing contents of the copied handwriting in the first region from the second region.

In a possible embodiment of the present disclosure, the second region is a remaining region in the display region except the first region; or the second region is a part of the remaining region in the display region except the first region.

In a possible embodiment of the present disclosure, subsequent to determining the first region and the second region in the display region of the display screen, the method further includes: copying the at least a part of the contents in the display region to the second region for display.

In a possible embodiment of the present disclosure, the display brightness of the second region is greater than a display brightness of other regions in the display region.

In a possible embodiment of the present disclosure, the display region further includes a third region, the display brightness of the second region is greater than a display brightness of the third region, and the display brightness of the third region is greater than the display brightness of the first region.

In a possible embodiment of the present disclosure, subsequent to controlling the display brightness of the first region to be lower than the display brightness of the second region, the method further includes: adjusting the display brightness of the first region to a preset brightness after determining that an operation in the first region is ended for a preset period; or adjusting the display brightness of the first region to a display brightness of a previous display preset period after determining that an operation in the first region is ended for a preset period; or adjusting the display brightness of the first region to be the same as the display brightness of the second region after determining that an operation in the first region is ended for a preset period.

In a possible embodiment of the present disclosure, prior to determining the first region and the second region in the display region of the display screen, the method further includes: receiving a control instruction to reduce a display brightness of a full screen of the display screen.

In a possible embodiment of the present disclosure, the controlling the display brightness of the first region to be lower than the display brightness of the second region, includes receiving the touch operation instruction for the first region to increase the display brightness of the second region.

In a possible embodiment of the present disclosure, the determining the first region in the display region of the display screen, includes determining the first region in accordance with a predetermined position of the first region; or determining the first region corresponding to a control instruction in accordance with the received control instruction.

In a possible embodiment of the present disclosure, the determining the first region corresponding to the control instruction in accordance with the received control instruction, includes if the control instruction is a received touch operation instruction for controlling the first region, determining the first region in accordance with a position of the touch operation instruction in the display region; or if the control instruction is an instruction for detecting a human body position, determining the first region in accordance with the human body position.

In a possible embodiment of the present disclosure, the display brightness of the first region decreases as a distance between the human body position and the intelligent interactive tablet decreases.

In a possible embodiment of the present disclosure, the display brightness of the first region decreasing as the distance between the human body position and the intelligent interactive tablet decreases, includes if the distance between the human body position and the intelligent interactive tablet is greater than an operation threshold and less than a viewing threshold, determining the display brightness of the first region to be a first level brightness, and the operation threshold being less than the viewing threshold; and if the distance between the human body position and the intelligent interactive tablet is less than or equal to the operation threshold, controlling the display brightness of the first region to be lower than the first level brightness.

In a possible embodiment of the present disclosure, an area of the first region decreases as the distance between the human body position and the intelligent interactive tablet decreases.

In a possible embodiment of the present disclosure, the determining the first region in accordance with the position of the touch operation instruction in the display region, includes if the touch operation instruction is a click operation instruction, obtaining a time difference between adjacent click operation instructions, and if the time difference is less than a continuous click threshold, determining the first region in accordance with a position of a latest received click operation instruction in the display region; or if the touch operation instruction is the writing instruction, determining the first region in accordance with a position of the writing instruction in the display region.

In a possible embodiment of the present disclosure, the determining the first region in accordance with the position of the touch operation instruction in the display region, includes determining a region within a preset range as the first region with the position of the touch operation instruction in the display region as a center; or determining a circular region with a radius of view as a radius as the first region with the position of the touch operation instruction in the display region as a center, and the radius of view being determined in accordance with a distance between the user sending the touch operation instruction and the intelligent interactive tablet.

In a possible embodiment of the present disclosure, the determining the first region in accordance with the human body position includes determining a center of a region corresponding to the human body position in the display region in accordance with the human body position, and determining the first region in accordance with the center of the region.

In a possible embodiment of the present disclosure, the determining the second region in the display region of the display screen, includes determining the second region in accordance with a predetermined position of the second region; or determining the second region corresponding to a control instruction in accordance with the received control instruction; or determining the second region corresponding to the first region in accordance with the first region.

In a possible embodiment of the present disclosure, the control instruction includes at least one of the following: the touch operation instruction; an instruction for a proximity sensor; an instruction for a distance sensor; an instruction for a Bluetooth receiver; an instruction for a hotspot receiver; an instruction for a WI-FI receiver; and an instruction for a peripheral device in communication connection with the intelligent interactive tablet.

In yet another aspect, the present disclosure provides in some embodiments a brightness adjustment device for an intelligent interactive tablet, including: a determination unit, configured to determine a first region and a second region in a display region of a display screen, wherein a position of the first region does not overlap a position of the second region, the first region includes at least a part of contents in the display region, and the first region is configured to receive a touch operation instruction from a user; and a control unit, configured to control a display brightness of the first region to be lower than a display brightness of the second region.

In a possible embodiment of the present disclosure, the brightness adjustment device further includes a receiving control unit, specifically configured to receive a touch operation instruction for the first region; and convert the touch operation instruction for the first region into a touch operation instruction for controlling the second region.

In a possible embodiment of the present disclosure, contents displayed in the first region include contents in the second region.

In a possible embodiment of the present disclosure, the receiving control unit is specifically configured to display a first icon in the second region; display a second icon associated with the first icon in the first region; receive a first touch operation instruction for the second icon in the first region; and convert the first touch operation instruction for the second icon in the first region into a second touch operation instruction for controlling the first icon in the second region.

In a possible embodiment of the present disclosure, subsequent to determining the first region and the second region in the display region of the display screen, the brightness adjustment device further includes a first copy unit, specifically configured to copy at least a part of the contents in the first region to the second region for display.

In a possible embodiment of the present disclosure, the first copy unit is specifically configured to receive a writing instruction from the first region, and generate handwriting in the first region in accordance with the writing instruction; and copy the handwriting generated in the first region to the second region for display.

In a possible embodiment of the present disclosure, subsequent to copying at least a part of the contents in the first region to the second region for display, the brightness adjustment device further includes a removing unit, specifically configured to determine that the writing instruction from the first region is ended, and remove contents of the copied handwriting in the first region from the second region.

In a possible embodiment of the present disclosure, the second region is a remaining region in the display region except the first region; or the second region is a part of the remaining region in the display region except the first region.

In a possible embodiment of the present disclosure, subsequent to determining the first region and the second region in the display region of the display screen, the brightness adjustment device further includes a second copy unit, specifically configured to copy the at least a part of the contents in the display region to the second region for display.

In a possible embodiment of the present disclosure, the display brightness of the second region is greater than a display brightness of other regions in the display region.

In a possible embodiment of the present disclosure, the display region further includes a third region, the display brightness of the second region is greater than a display brightness of the third region, and the display brightness of the third region is greater than the display brightness of the first region.

In a possible embodiment of the present disclosure, subsequent to controlling the display brightness of the first region to be lower than the display brightness of the second region, the brightness adjustment device further includes a recovery unit, specifically configured to adjust the display brightness of the first region to a preset brightness after determining that an operation in the first region is ended for a preset period; or adjust the display brightness of the first region to a display brightness of a previous display preset period after determining that an operation in the first region is ended for a preset period; or adjust the display brightness of the first region to be the same as the display brightness of the second region after determining that an operation in the first region is ended for a preset period.

In a possible embodiment of the present disclosure, prior to determining the first region and the second region in the display region of the display screen, the control unit is specifically configured to receive a control instruction to reduce a display brightness of a full screen of the display screen.

In a possible embodiment of the present disclosure, the control unit is specifically configured to receive the touch operation instruction for the first region to increase the display brightness of the second region.

In a possible embodiment of the present disclosure, the determination unit is specifically configured to determine the first region in accordance with a predetermined position of the first region; or determine the first region corresponding to a control instruction in accordance with the received control instruction.

In a possible embodiment of the present disclosure, the determination unit is specifically configured to: if the control instruction is a received touch operation instruction for controlling the first region, determine the first region in accordance with a position of the touch operation instruction in the display region; or if the control instruction is an instruction for detecting a human body position, determine the first region in accordance with the human body position.

In a possible embodiment of the present disclosure, the display brightness of the first region decreases as a distance between the human body position and the intelligent interactive tablet decreases.

In a possible embodiment of the present disclosure, the control unit is specifically configured to if the distance between the human body position and the intelligent interactive tablet is greater than an operation threshold and less than a viewing threshold, determine the display brightness of the first region to be a first level brightness, and the operation threshold being less than the viewing threshold; and if the distance between the human body position and the intelligent interactive tablet is less than or equal to the operation threshold, control the display brightness of the first region to be lower than the first level brightness.

In a possible embodiment of the present disclosure, an area of the first region decreases as the distance between the human body position and the intelligent interactive tablet decreases.

In a possible embodiment of the present disclosure, the determination unit is specifically configured to: if the touch operation instruction is a click operation instruction, obtain a time difference between adjacent click operation instructions, and if the time difference is less than a continuous click threshold, determine the first region in accordance with a position of a latest received click operation instruction in the display region; or if the touch operation instruction is the writing instruction, determine the first region in accordance with a position of the writing instruction in the display region.

In a possible embodiment of the present disclosure, the determination unit is specifically configured to: determine a region within a preset range as the first region with the position of the touch operation instruction in the display region as a center; or determine a circular region with a radius of view as a radius as the first region with the position of the touch operation instruction in the display region as a center, and the radius of view being determined in accordance with a distance between the user sending the touch operation instruction and the intelligent interactive tablet.

In a possible embodiment of the present disclosure, the determination unit is specifically configured to: determine a center of a region corresponding to the human body position in the display region in accordance with the human body position, and determine the first region in accordance with the center of the region.

In a possible embodiment of the present disclosure, the determination unit is specifically configured to: determine the second region in accordance with a predetermined position of the second region; or determine the second region corresponding to a control instruction in accordance with the received control instruction; or determine the second region corresponding to the first region in accordance with the first region.

In a possible embodiment of the present disclosure, the control instruction includes at least one of the following: the touch operation instruction; an instruction for a proximity sensor; an instruction for a distance sensor; an instruction for a Bluetooth receiver; an instruction for a hotspot receiver; an instruction for a WI-FI receiver; and an instruction for a peripheral device in communication connection with the intelligent interactive tablet.

In still yet another aspect, the present disclosure provides in some embodiments a computer storage medium storing therein a computer program, and the computer program is executed by a processor so as to implement the steps in the above-mentioned method.

These and other aspects of the present disclosure will be more concise and understandable in the descriptions of the following embodiments.

BRIEF DESCRIPTION OF THE DRAWINGS

In order to illustrate the technical solutions of the embodiment of the present disclosure in a clearer manner, the drawings desired for the embodiment of the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

Figure 1:
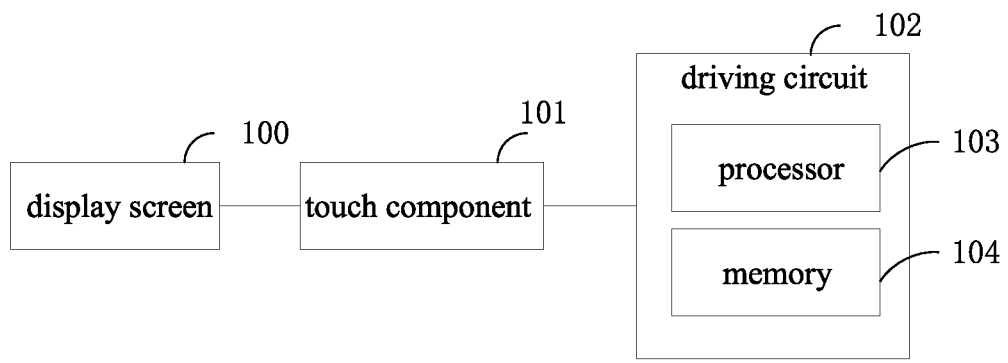
FIG. 1 is a schematic view of an intelligent interactive tablet according to one embodiment of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Application scenarios described in the embodiments of the present disclosure are intended to more clearly illustrate the technical solutions of the embodiments of the present disclosure, but the present disclosure is not limited thereto. With the emergence of new application scenarios, a person skilled in the art may know that the technical solutions provided in the embodiments of the present disclosure are also applicable to similar technical problems. Unless otherwise defined, "a plurality" means two or more.

At present, splicing products ranging from 135 inches to 165 inches are emerging for indoor light-emitting diode (LED) display products. With the development of the technology, the indoor LED display products begin to be equipped with an infrared touch bezel to achieve such functions as touch and video conferencing. However, in the process of using, especially when manipulating or writing at a short distance, its high brightness easily causes visual fatigue and is very dazzling. LED displays have such advantages as high brightness, size that may be arbitrarily spliced, and suitable for large venues and large conference rooms, and it is very clear and bright when watched from a long distance. At present, more and more LED splicing products begin to be equipped with the infrared touch bezel to achieve writing and touch functions, and integrated with camera, microphone, screen transmitter and other accessories for conference scenes. It also makes up for the seam problem of LCD products in super-large size.

After the installation of LED splicing machine, there are two methods to adjust the brightness of LED display screen. One is manual arrangement, i.e., the display brightness is set through system software; the other is that a whole machine has been installed with an ambient light detection sensor, which adjusts the LED display brightness according to the ambient brightness. The above two methods are conventional brightness adjustment methods, and an adjusted brightness is set to L0, i.e., a brightness value suitable for the current environment and remote viewing. According to a conventional industry product, L0 may be around 500 nit to 600 nit. Touch and writing operations need to be completed by users at a short distance, the high brightness of the LED displays is very harmful to human eyes.

In order to solve the above technical problems, an object of the present disclosure is to provide a more intelligent method for adjusting brightness, so that the brightness of a user's operation region may be lower than the brightness of other regions when the user operates at a short distance, so as to intelligently reduce the display brightness of the LED screen used by the user who operates at a short distance, and thereby to improve user's experience.

The present disclosure provides in some embodiments an intelligent interactive tablet, which includes, but not limited to, LED splicing products and liquid crystal display (LCD) products, and has such characteristics as large size and high brightness. As shown in FIG. 1, the intelligent interactive tablet includes a display screen 100, a touch component 101 and a driving circuit 102. The display screen 100 is configured to display contents; the touch component 101 is configured to receive a touch operation instruction; and the driving circuit 102 includes a processor 103 and a memory 104, the memory 104 is configured to store a program executable by the processor 103, and the processor 103 is configured to read the program stored in the memory 104 and execute the following steps: step 1 of determining a first region and a second region in a display region of the display screen, wherein a position of the first region does not overlap a position of the second region, contents displayed in the first region include at least a part of contents in the display region, and the first region is configured to receive the touch operation instruction from a user, and the position of the first region does not overlap the position of the second region; and step 2 of controlling a display brightness of the first region to be lower than a display brightness of the second region.

In the embodiments of the present disclosure, the display region of the display screen is divided into two regions, i.e., the first region and the second region. The first region is configured to receive the touch operation instruction from the user, i.e., the first region is a region for the user to perform a short-distance operation, and the second region may be configured as a region for display, so as to facilitate users to watch from a long distance. In a possible embodiment of the present disclosure, the second region may also be configured as a region for receiving the touch operation instruction, or the second region may be configured as a region for display and receiving a touch operation, which will not be particularly defined herein. In the embodiments of the present disclosure, the display brightness of the first region is controlled to be lower than the display brightness of the second region, the display brightness of the first region operated by the user who operates the intelligent interactive tablet at a short distance is reduced and is lower than the display brightness of the second region. Since the first region is a region operated by the user and the second region is a region watched by the users from a long distance, the brightness of the first region is lower than the brightness of the second region, it is able to improve user's experience of the user who operates the intelligent interactive tablet at a short distance without affecting the users who watch the intelligent interactive tablet from a long distance, and it is able to avoid visual fatigue caused by the high brightness of the intelligent interactive tablet, thereby to improve user's experience.

It should be appreciated that, the division of the first region and the second region in the embodiments of the present disclosure is only an example showing a region division based on software or algorithms, that is, the processor of the intelligent interactive tablet is used to divide the display screen into regions through algorithms or software. The first region and the second region in the region displayed in the full screen display screen are distinguish through various forms such as a region frame, a region block, and a boundary line, but the display screen does not have the division of the above regions in hardware.

In a possible embodiment of the present disclosure, the contents displayed in the first region include at least a part of contents in the display region.

Figure 2:
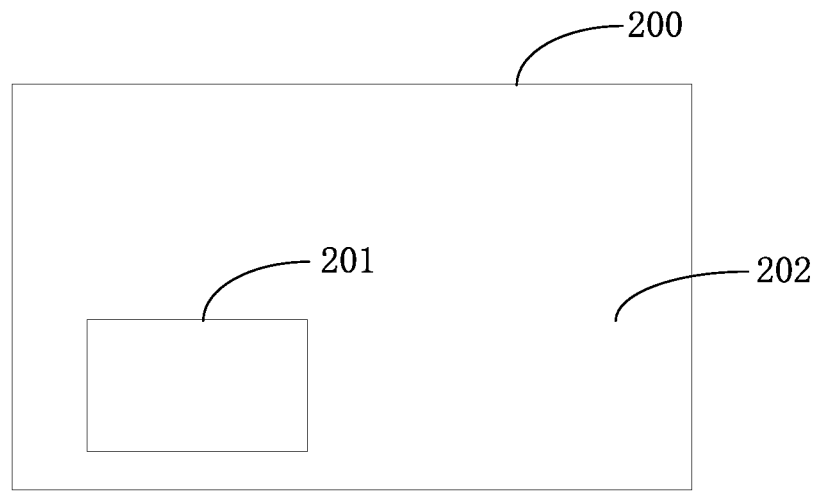
FIG. 2 is a schematic view of a first region and a second region according to one embodiment of the present disclosure.
Figure 3:
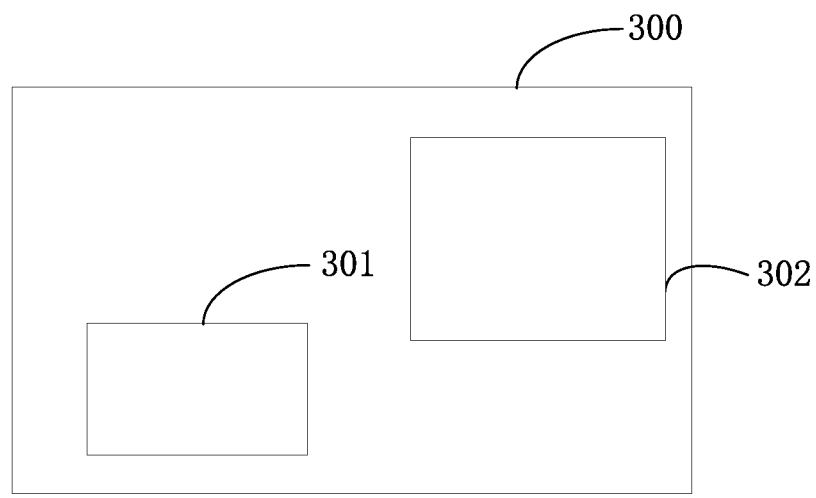
FIG. 3 is another schematic view of the first region and the second region according to one embodiment of the present disclosure.
Figure 4A:
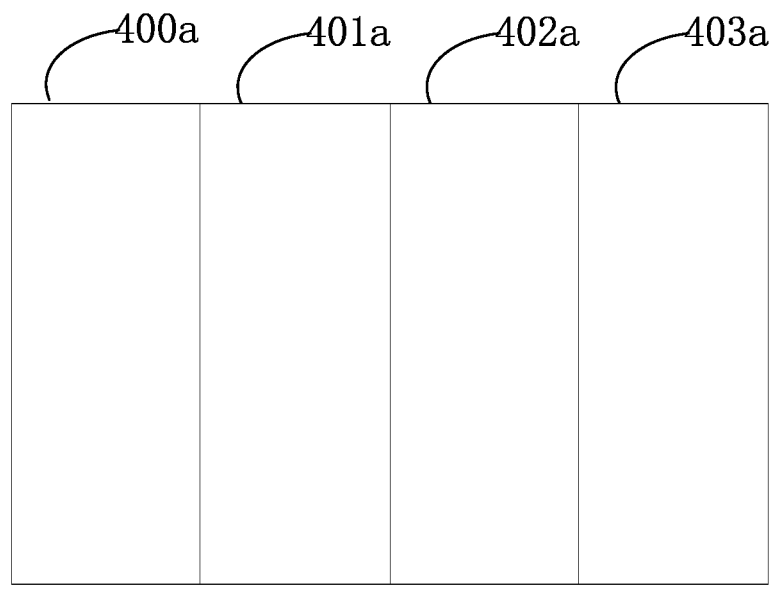
FIG. 4A is yet another schematic view of the first region and the second region according to one embodiment of the present disclosure.
Figure 4B:
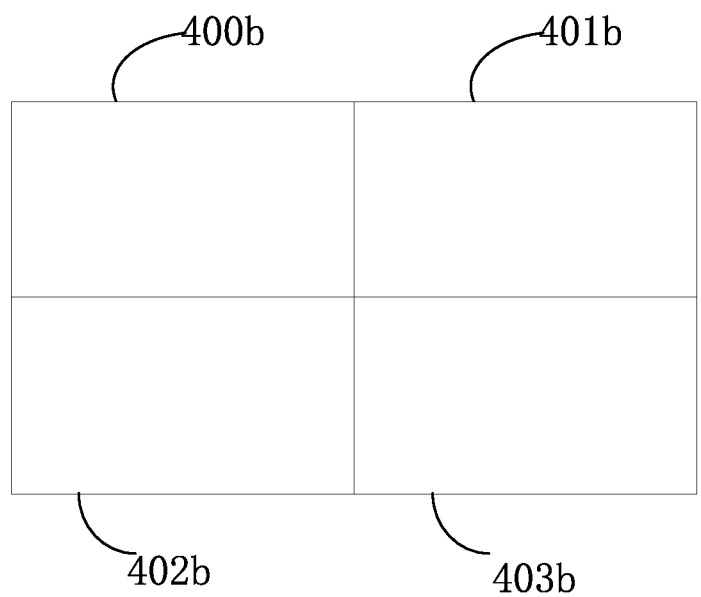
FIG. 4B is still yet another schematic view of the first region and the second region according to one embodiment of the present disclosure.

In a possible embodiment of the present disclosure, as shown in FIG. 2, the second region 202 is a remaining region in the display region 200 except the first region 201; or, as shown in FIG. 3, the second region 302 is a part of the remaining region in the display region 300 except the first region 301, and the second region does not overlap the first region. In a possible embodiment of the present disclosure, the shapes of the first region and the second region may be the same or different, which will not be particularly defined herein. In a possible embodiment of the present disclosure, the display region may be evenly divided into a predetermined quantity of equally divided regions. For example, as shown in FIG. 4A, the display region is divided into four equal screens, including four regions 400a, 401a, 402a, and 403a, the first region is located in one of the four regions, and the second region is located in any one of the other three regions except the first region. In a possible embodiment of the present disclosure, as shown in FIG. 4B, the display region may also be divided into a Chinese-田-shaped region, including four regions 400b, 401b, 402b, and 403b, the first region is located in one of the four regions, and the second region is located in any one of the other three regions except the first region. In the embodiments of the present disclosure, the position relationship between the first region and the second region is, but not limited to, diagonal, adjacent, and axial symmetry, which will not be particularly defined herein.

In a possible embodiment of the present disclosure, contents displayed in at least a part of the first region of the display region include the contents in the second region, i.e., the contents in the first region include the contents in the second region.

Optionally, the contents displayed in the first region include a thumbnail of the second region, or the contents displayed in the first region include the background of the second region, or the contents displayed in the first region include core contents such as some key icons, texts and images of the second region, or the contents displayed in the first region include a part or all of the contents in the second region after the background of the second region is removed. During an implementation, the contents in the second region required to be displayed in the first region are determined in accordance with user's requirements, and are copied to the first region for display. When the first region is configured as an operation region of the user, the contents in the second region may be displayed in the first region, so that the user may conveniently operate in the operation region (the first region) when using a large screen, thereby to improve user's experience. The contents in the second region may be copied and displayed in the first region in a zooming or panning manner, for example, icons in the second region are zoomed and then copied and displayed in the first region, or the contents in the second region with removed background are zoomed and then copied and displayed in the first region, or all the contents in the second region are zoomed and then copied and displayed in the first region. The display mode of the second region in the first region provided in the embodiments of the present disclosure is only an example, and any display mode determined based on the core idea of the present disclosure is within the scope of the present disclosure.

In the embodiments of the present disclosure, partial contents in the display region in this embodiment include, but not limited to, the background of the display region, the icons in the display region, documents in the display region, and images in the display region. The partial contents in the display region also include a part or all of the contents in the second region, and a part or all of the contents in other regions except the first region and the second region.

In a possible embodiment of the present disclosure, if the first region includes an icon in the second region, a touch operation instruction for the icon in the first region may be received; and the touch operation instruction for the icon in the first region is converted into a touch operation instruction for controlling the icon in the second region. Optionally, a first icon is displayed in the second region; a second icon associated with the first icon is displayed in the first region; a first touch operation instruction for the second icon in the first region is received; and the first touch operation instruction for the second icon in the first region is converted into a second touch operation instruction for controlling the first icon in the second region. During an implementation, when the first region includes the contents in the second region, for example, the first region displays the icons in the second region, the user may operate the icon in the second region displayed in the first region. Due to the large screen size of a conventional display screen, it is inconvenient for touch interaction of the user. According to the method in the embodiments of the present disclosure, it is able to display some key contents in the larger screen in the first region (an region convenient for the user to perform touch operation), so that the user may operate the key contents displayed in the full screen in the first region at a short distance, thereby to effectively improve the operation experience of the user on the large screen.

In a possible embodiment of the present disclosure, the first touch operation instruction and the second touch operation instruction are proposed definitions for distinguishing a touch operation on the second icon in the first region from a touch operation on the first icon in the second region. In essence, both the first touch operation instruction and the second touch operation instruction conform to the definition of the touch operation instruction in the embodiments of the present disclosure. Optionally, the first touch operation instruction for the second icon includes, but not limited to, an icon click operation instruction, an icon opening operation instruction, an icon starting operation instruction, and an icon deletion operation instruction. The second touch operation instruction includes, but not limited to, an icon click operation instruction, an icon opening operation instruction, an icon starting operation instruction, and an icon deleting operation instruction. It should be appreciated that, the first touch operation instruction corresponds to the second touch operation instruction, and during an implementation, the user only needs to execute the first touch operation instruction for the second icon in the first region. Accordingly, the processor of the intelligent interactive tablet in the embodiments of the present disclosure converts the first touch operation instruction into the second touch operation instruction for the first icon. Therefore, according to the embodiments of the present disclosure, the first touch operation instruction for the second icon is equivalent to the second touch operation instruction for the first icon, for example, a click operation on the second icon in the first region is correspondingly converted into a click operation on the first icon in the second region.

Figure 5A:
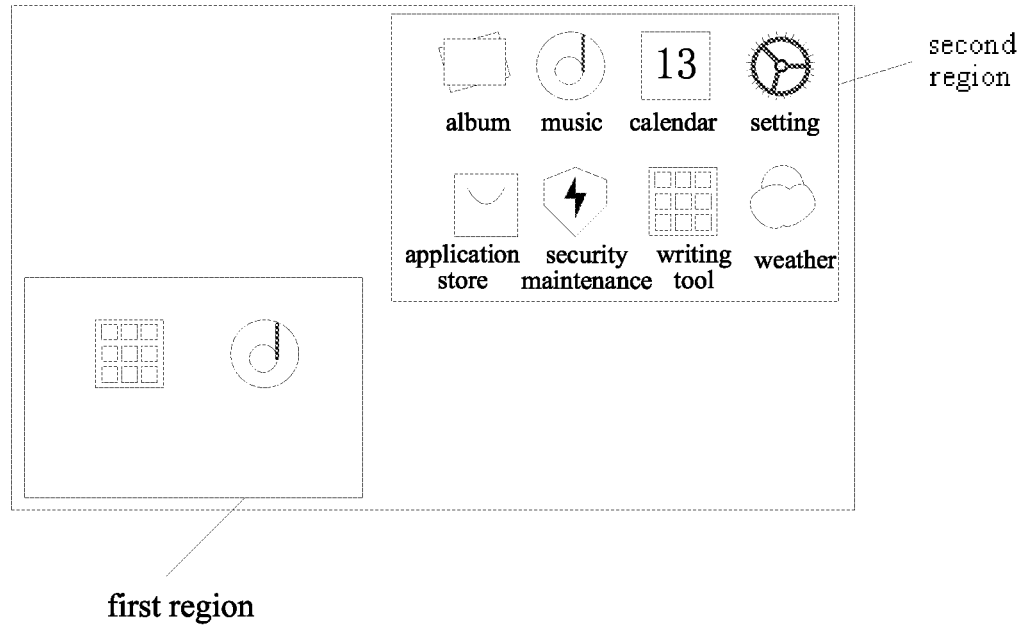
FIG. 5A is a schematic view of displaying a second icon according to one embodiment of the present disclosure.
Figure 5B:
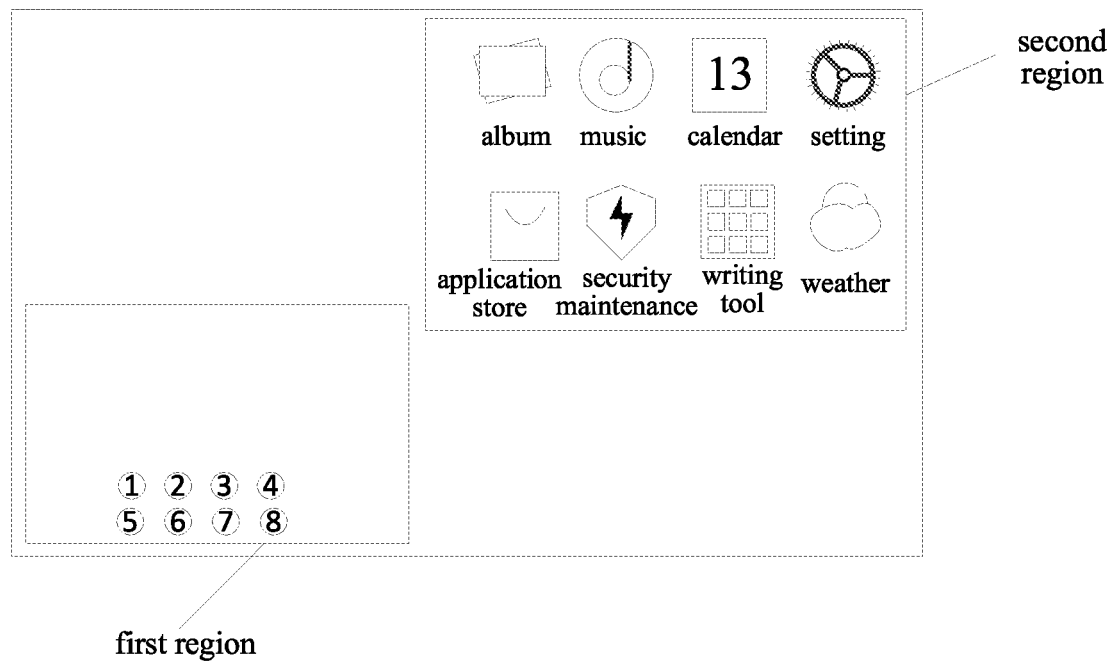
FIG. 5B is another schematic view of displaying the second icon according to one embodiment of the present disclosure.
Figure 5C:
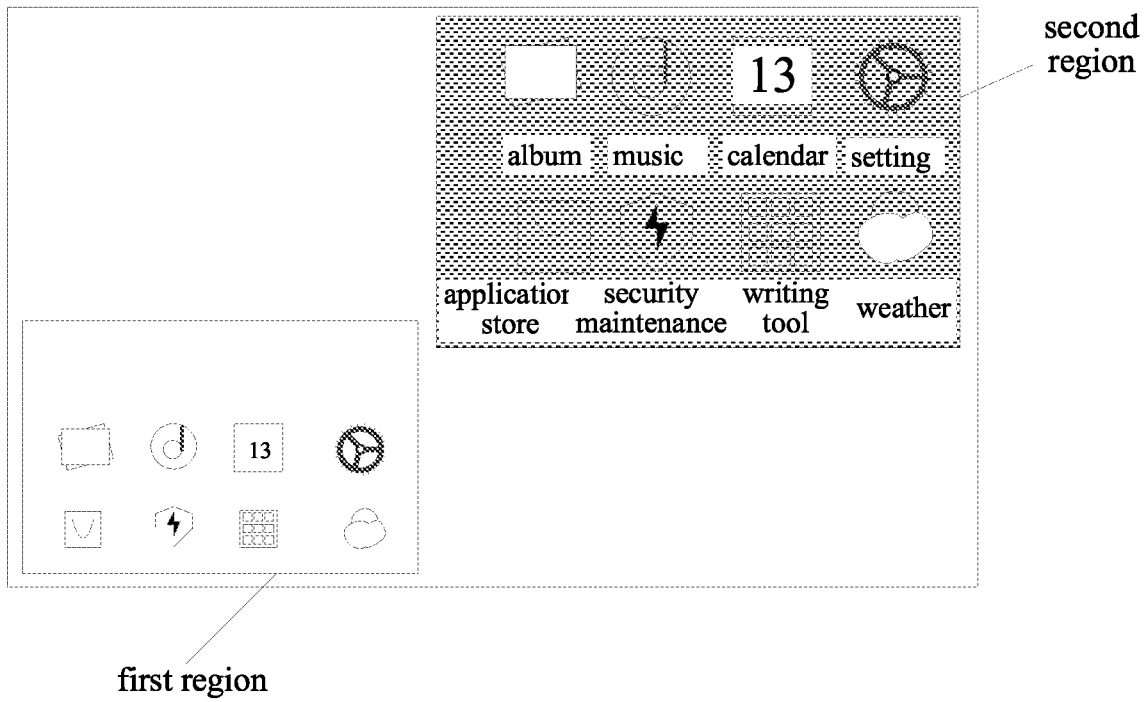
FIG. 5C is yet another schematic view of displaying the second icon according to one embodiment of the present disclosure.
Figure 5D:
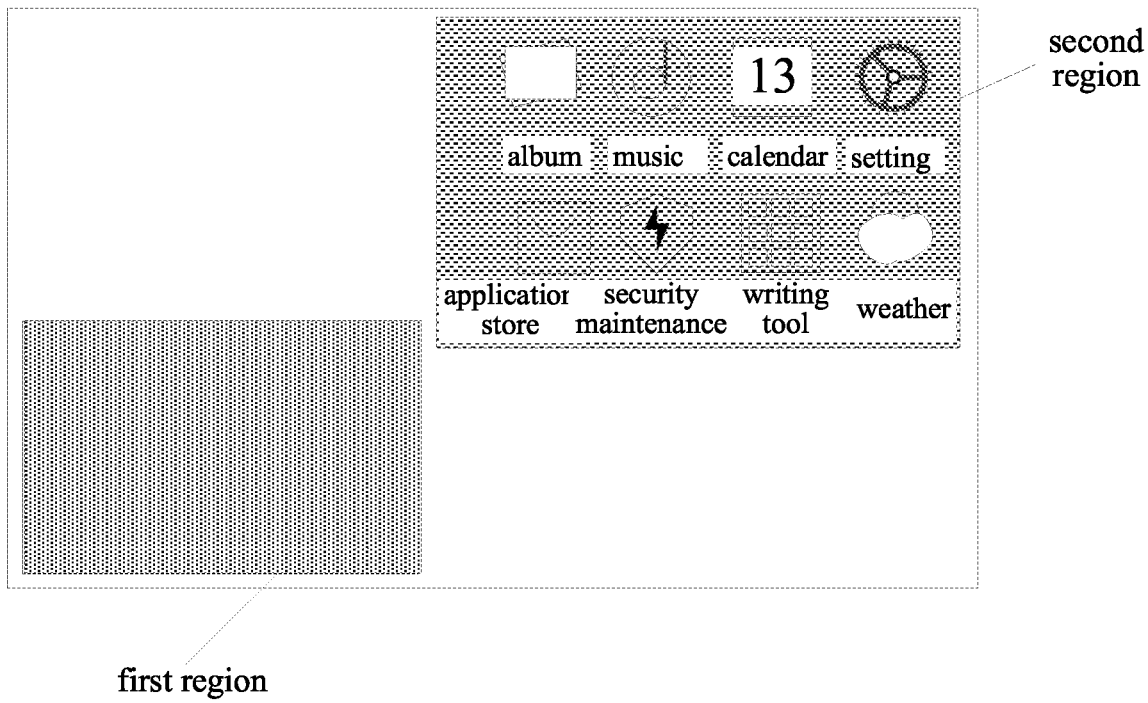
FIG. 5D is still yet another a schematic view of displaying the second icon according to one embodiment of the present disclosure.

In a possible embodiment of the present disclosure, the first icon displayed in the second region and the second icon associated with the first icon displayed in the first region may be the same or different in shape; and may be the same or different in name. In the embodiments of the present disclosure, the first icon and the second icon may be completely the same or different; a position of the second icon in the first region may be the same as or different from a position of the first icon in the second region. The first icon and the second icon are associated with each other, and the shape, name, color, and position of the first icon and the second icon having the associated relationship are not limited. A plurality of ways to display second icons associated with first icons in the first region is shown FIG. 5A to FIG. 5D. FIG. 5A shows that only a part of the icons in the second region is displayed in the first region, and names corresponding to the icons are not displayed. FIG. 5B shows that all the icons in the second region are displayed in the first region, the shape of each icon is changed; and FIG. 5B shows that all the icons in the second region are displayed at corresponding positions in the first region, icon 1 corresponds to album, icon 2 corresponds to music, icon 3 corresponds to calendar, icon 4 corresponds to setting, icon 5 corresponds to application store, icon 6 corresponds to security maintenance, icon 7 corresponds to writing tool, and icon 8 corresponds to weather. FIG. 5C shows that all the icons in the second region are zoomed and displayed in the first region without displaying the names of the icons or the background of the second region. FIG. 5D shows that the background of the second region is displayed in the first region. It should be appreciated that, the ways of displaying the icons in the second region in the first region in this embodiment are only examples, and the ways of displaying the icons determined based on the same concept all within the scope of protection of the present disclosure.

In a possible embodiment of the present disclosure, subsequent to determining the first region and the second region in the display region of the display screen, the processor is further configured to: copy at least a part of the contents in the first region to the second region for display. Optionally, the processor is configured to: receive a writing instruction from the first region, and generate handwriting in the first region in accordance with the writing instruction; and copy the handwriting generated in the first region to the second region for display. The handwriting in the first region may be copied to the second region for display. In the embodiments of the present disclosure, subsequent to generating handwriting in the first region, the handwriting is copied to the second region, and the written contents are retained. During an implementation, when the user performs writing operation in the first region, contents related to the writing may be displayed in the second region, it is able for the users form a long distance to watch the contents written by the user in real time, thereby to improve interactive experience.

In a possible embodiment of the present disclosure, subsequent to copying at least a part of the contents in the first region to the second region for display, it is able to remove contents of the copied handwriting in the first region from the second region after determining that the writing instruction from the first region is ended. In the embodiments of the present disclosure, the writing instruction is determined to be ended in any one or more of the following ways: determining that the writing is completed, determining to wait for a preset period after the writing is completed, determining to close or delete the first region, and determining to receive an end instruction triggered by the user, which will not be particularly defined herein.

In a possible embodiment of the present disclosure, the first region is determined through any one of the following.

Mode 1: determining the first region in accordance with a predetermined position of the first region.

Mode 2: determining the first region corresponding to a control instruction in accordance with the received control instruction.

In a possible embodiment of the present disclosure, the second region is determined through any one of the following.

Mode 3: determining the second region in accordance with a predetermined position of the second region.

Mode 4: determining the second region corresponding to a control instruction in accordance with the received control instruction.

Mode 5: determining the second region corresponding to the first region in accordance with the first region.

In a possible embodiment of the present disclosure, a predetermined correspondence between the first region and the second region includes, but not limited to, any one of the following: the position relationship between the first region and the second region on the display region being axial symmetry or central symmetry. When the display region is divided into four equal screens in FIG. 4A, the first region is located in 400*a* and the second region is located in one of 401*a*, 402*a* and 403*a*, or at least one region is arranged between the first region and the second region, i.e., the second region is located in one of 402*a* and 403*a*; or the first region is located in 401*a* and the second region is located in one of 400*a*, 402*a* and 403*a*; or the first region is located in 402*a* and the second region is located in one of 400*a*, 401*a* and 403*a*; or the first region is located in 403*a* and the second region is located in one of 400*a*, 401*a* and 402*a*. When the display region is the Chinese- 田-shaped region in FIG. 4B, the first region is located in 402*b*, and the second region is located in one of 400*b*, 401*b* and 403*b*; or the first region is located in 403*b*, and the second region is located in one of 400*b*, 401*b* and 402*b*; and in order to facilitate the user's operation, the first region is generally arranged at a region close to the ground, but is not particularly defined herein, and the first region may also be located in 400*b* or 401*b*, if the first region is located in 400*b*, the second region is located in one of 401*b*, 402*b* and 403*b*, and if the first region is located in 401*b*, the second region is located in one of 400*b*, 402*b* and 403*b*.

The above mode 1 and mode 2 for determining the first region and the mode 3 to mode 5 for determining the second region may be combined with each other, and several combinations are given below.

Example 1: determining the first region in accordance with a predetermined position of the first region and determining the second region in accordance with a predetermined position of the second region.

During an implementation, after the intelligent interactive tablet is turned on, the first region is determined in accordance with a predetermined position of the first region on the intelligent interactive tablet, and the second region is determined in accordance with a predetermined position of the second region on the intelligent interactive tablet. In order to facilitate the user to operate the intelligent interactive tablet at a short distance, the first region may be determined in accordance with a height range of the user, and the second region may be determined in accordance with a comfort range of the users watching the intelligent interactive tablet from a long distance. For example, it is determined that the position of the first region is within the range of 1 to 2 meters above the ground on the intelligent interactive tablet, and the position of the second region is within the range of more than 2 meters above the ground on the intelligent interactive tablet.

Example 2: determining the first region in accordance with a predetermined position of the first region and determining the second region corresponding to a control instruction in accordance with the received control instruction.

During an implementation, the position of the first region on the intelligent interactive tablet may be predetermined, and the position of the second region may be determined by receiving a control instruction. Optionally, different control instructions correspond to the same second region, or different control instructions correspond to different second regions, which will not be particularly defined herein.

Example 3: determining the first region corresponding to a control instruction in accordance with the received control instruction and determining the second region in accordance with a predetermined position of the second region.

During an implementation, the position of the second region on the intelligent interactive tablet may be predetermined, and the position of the first region may be determined by receiving a control instruction. Optionally, different control instructions correspond to the same first region, or different control instructions correspond to different first regions, which will not be particularly defined herein.

Example 4: determining the first region corresponding to a control instruction in accordance with the received control instruction and determining the second region corresponding to the first region in accordance with the first region.

During an implementation, the position of the first region on the intelligent interactive tablet may be determined by receiving a control instruction, and different control instructions correspond to the same first region, or different control instructions correspond to different first regions, which will not be particularly defined herein. The position of the second region on the intelligent interactive tablet may be determined in accordance with the first region, and after the first region is determined, the second region corresponding to the first region may be determined in accordance with the position of the first region on the intelligent interactive tablet. In a possible embodiment of the present disclosure, the position of the second region may be determined in accordance with a predetermined position relationship between the first region and the second region. The position relationship between the first region and the second region includes, but not limited to, axial symmetry, central symmetry, and adjacency. In the embodiments of the present disclosure, if the display region is divided into the plurality of regions in FIG. 4, at least one other region is separated between the first region and the second region. For example, the second region is located one of above, below, to the left, and to the right of the first region. In the embodiments of the present disclosure, the position relationship between the first region and the second region will not be particularly defined herein.

In the embodiments of the present disclosure, the control instruction includes, but not limited to, any one or more of the following: the touch operation instruction; an instruction for a proximity sensor; an instruction for a distance sensor; an instruction for a Bluetooth receiver; an instruction for a hotspot receiver; an instruction for a WI-FI receiver; and an instruction for a peripheral device in communication connection with the intelligent interactive tablet. The touch operation instruction may be an instruction received by the touch component. The instruction for a proximity sensor and the instruction for a distance sensor represent a detected position of the human body, that is, the distance between the human body and the intelligent interactive tablet may be measured though these instructions. The instruction for a Bluetooth receiver, the instruction for a hotspot receiver and the instruction for a WI-FI receiver represent the instructions sent by a terminal that establishes communication connections with the intelligent interactive tablet. The instruction for a peripheral device in communication connection with the intelligent interactive tablet includes, but not limited to, an instruction sent by a touch pen and an instruction sent by a remote controller, e.g., a click operation on a shortcut button arranged on the touch pen.

In a possible embodiment of the present disclosure, the touch operation instruction from the user received by the first region includes, but not limited to, a click instruction, a writing instruction, and an instruction sent by a key.

In a possible embodiment of the present disclosure, the first region is determined in accordance with the received control instruction, and when the intelligent interactive tablet receives the control instruction, the first region is determined through any of the following methods.

Method 1: if the control instruction is a received touch operation instruction for controlling the first region, determining the first region in accordance with a position of the touch operation instruction in the display region.

In a possible embodiment of the present disclosure, the first region is determined in accordance with the position of the touch operation instruction through any of the following methods.

Method 1a: if the touch operation instruction is a click operation instruction, obtaining a time difference between adjacent click operation instructions, and if the time difference is less than a continuous click threshold, determining the first region in accordance with a position of a latest received click operation instruction in the display region.

In the embodiments of the present disclosure, in order to prevent the user from continuously clicking the contents in the first region, which may cause the display brightness of the first region to be unstable and suddenly bright and dark, the first region may be determined by detecting the last click operation instruction in continuously operated touch operation instructions.

Method 1b: if the touch operation instruction is the writing instruction, determining the first region in accordance with a position of the writing instruction in the display region.

During an implementation, the first region in different positions may be determined along with different writing instructions. If the position of the writing instruction is continuously changed in a writing process of the user, whether the position of the first region is updated or not may be determined in accordance with whether a change range of the writing instruction exceeds a threshold; and if the change range of the writing instruction exceeds the threshold value, the first region in accordance with the position of the latest writing instruction should be updated.

In a possible embodiment of the present disclosure, the first region is determined in accordance with the position of the touch operation instruction through any of the following methods.

Method 1c: determining a region within a preset range as the first region with the position of the touch operation instruction in the display region as a center.

In the embodiments of the present disclosure, the shape of the first region is not particularly defined. The region within the preset range is in the display region.

Figure 6:
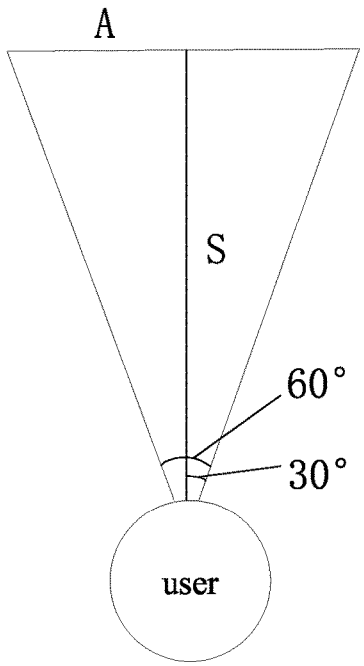
FIG. 6 is a schematic view of determining a radius of view according to one embodiment of the present disclosure.

Method 1d: determining a circular region with a radius of view as a radius as the first region with the position of the touch operation instruction in the display region as a center, and the radius of view being determined in accordance with a distance between the user sending the touch operation instruction and the intelligent interactive tablet. During an implementation, as shown in FIG. 6, the radius of view is determined as follows.

The visual degree of the human eyes is about 124 degrees, during the focus of attention, the visual degree is about one-fifth, i.e., 25 degrees, and a comfortable visual field of one eye is 60 degrees. It is able to preliminarily set, when the user distance from the screen is S, the user's visual sensitive region is 30 degrees around a central axis of the field of view. It may be calculated that the radius of view $A=S/\sqrt{3}$, and the first region is a circle with the radius of view A as the radius.

It should be appreciated that, the methods 1c) to 1d) and the methods 1a) to 1b) in the embodiments of the present disclosure belong to two parallel schemes for determining the first region, respectively. The methods 1a) to 1b) show determining the first region in accordance with different touch operation instructions, and methods 1c) to 1d) show determining the first region in accordance with the touch operation instruction. The two parallel schemes may be implemented in combination.

Method 2: if the control instruction is an instruction for detecting a human body position, determining the first region in accordance with the human body position and a distance between the human body position and the intelligent interactive tablet.

In a possible embodiment of the present disclosure, the first region may be determined in accordance with the distance between the user and the intelligent interactive tablet, and the specific steps are as follows.

A center of a region corresponding to the human body position in the display region is determined in accordance with the human body position, and the first region is determined in accordance with the center of the region. In the embodiments of the present disclosure, the center of the region may be a position of the display region facing the face, or a position of the display region facing the shoulder, or a position of the display region facing the chest, which may be arranged in accordance with the needs of the user, which will not be particularly defined herein. During an implementation, the first region is determined in accordance with the center of the region through any one of the following.

Method 2a: determining a region within a preset range as the first region with the center of the region as a center.

Method 2b: determining a circular region with a radius of view as a radius as the first region with the center of the region as a center, and the radius of view being determined in accordance with a distance between the user sending the touch operation instruction and the intelligent interactive tablet. During an implementation, as shown in FIG. 6, the radius of view is determined as follows.

The visual degree of the human eyes is about 124 degrees, during the focus of attention, the visual degree is about one-fifth, i.e., 25 degrees, and a comfortable visual field of one eye is 60 degrees. It is able to preliminarily set, when the user distance from the screen is S, the user's visual sensitive region is 30 degrees around a central axis of the field of view. It may be calculated that the radius of view $A=S/\sqrt{3}$, and the first region is a circle with the radius of view A as the radius.

Method 3: if the control instruction is an instruction except the touch operation instruction and the instruction for detecting the human body position, determining the first region in accordance with a predetermined position.

In a possible embodiment of the present disclosure, the display brightness of the first region decreases as a distance between the human body position and the intelligent interactive tablet decreases. Optionally, a multi-level dimming scheme may be arranged, and the display brightness of the first region is controlled to be gradually reduced as the human body gets closer to the intelligent interactive tablet. In a possible embodiment of the present disclosure, the step-down scheme is as follows.

If the distance between the human body position and the intelligent interactive tablet is greater than an operation threshold and less than a viewing threshold, the display brightness of the first region is determined to be a first level brightness, and the operation threshold is less than the viewing threshold; and if the distance between the human body position and the intelligent interactive tablet is less than or equal to the operation threshold, display brightness of the first region is controlled to be lower than the first level brightness. During an implementation, when the user is in a click operation state, the display brightness of the first region may be reduced, and when the user is in a writing operation state, the display brightness of the first region may be reduced again. It should be appreciated that, the above two-level dimming scheme is only an example of the multi-level dimming scheme in the embodiments of the present disclosure, and the multi-level dimming schemes based on the above principle falls within the scope of protection of the present disclosure.

In a possible embodiment of the present disclosure, an area of the first region decreases as the distance between the human body position and the intelligent interactive tablet decreases. It should be appreciated that, when the user operates at a short distance, a smaller first region may be arranged, so as to ensure that the users form a long distance may watch more contents except the first region while the user operates, thereby to improve the watching experience.

In a possible embodiment of the present disclosure, the processor of the intelligent interactive tablet is further configured to execute: receiving the touch operation instruction for the first region; and converting the touch operation instruction for the first region into a touch operation instruction for controlling the second region. During an implementation, the user may control the second region to execute the touch operation while performing the touch operation in the first region, i.e., the touch operation instruction executed in the first region may be synchronously executed in the second region.

In a possible embodiment of the present disclosure, in order to ensure that the users from a long distance may watch operation contents of the user who is operating the intelligent interactive tablet, a display method of the second region is provided, which includes, but not limited to, any one of the following.

Method 1: copying the at least a part of the contents in the display region to the second region for display.

In the embodiments of the present disclosure, at least a part of contents in the display region may be copied to the second region for display, so that the user may operate in the first region without affecting the users from a long distance to watch the contents in the display region.

Method 2: copying at least a part of the contents in the first region to the second region for display.

In the embodiments of the present disclosure, the second region may be controlled to copy the contents of the operation being performed in the first region. For example, the first region receives a click operation instruction to perform a click operation on an icon, and the icon and the click operation on the icon may be copied and displayed in the second region, or the first region receives a writing instruction to perform a writing operation, both the writing instruction and the writing operation may be copied and displayed in the second region. That is, the contents displayed in the first region may be copied to the second region, and a corresponding operation is executed in the second region in accordance with the touch operation instruction for the first region, so that the users from a long distance may watch real-time operation contents of the user operating the intelligent interactive tablet.

In a possible embodiment of the present disclosure, subsequent to copying at least a part of the contents in the first region to the second region for display, it is able to determine whether the writing instruction from the first region is completed, and if it is determined that the writing instruction from the first region is completed, all the contents in the second region are removed. After the user finishes writing, the users from a long distance do not need to continue to watch the written contents, so all the contents in the second region may be removed after the writing in the first region is ended, so as to improve the use's experience of the users from a long distance.

In a possible embodiment of the present disclosure, the display brightness of the second region may be greater than a display brightness of other regions in the display region. The second region is provided for the users from a long distance to watch, so the display brightness of the second region may be arranged to be the highest brightness in the display region, thereby to achieve use's experience of the users from a long distance.

In a possible embodiment of the present disclosure, the brightness of the display region may include a plurality of different brightness levels, the display brightness of the first region is the lowest brightness, and the display brightness of the second region is the highest brightness. If there are other regions in the display region except the first region and the second region, the display brightness of the other regions is greater than the display brightness of the first region, and is lower than the display brightness of the second region.

Optionally, the display region further includes a third region, the display brightness of the second region is greater than a display brightness of the third region, and the display brightness of the third region is greater than the display brightness of the first region.

In a possible embodiment of the present disclosure, the present disclosure further provides a method for reducing the display brightness of a full screen, including prior to determining the first region and the second region in the display region of the display screen, receiving a control instruction to reduce a display brightness of a full screen of the display screen. At this time, the brightness of the first region and the second region are both reduced to the lowest, if the touch operation instruction for the first region is received, the display brightness of the second region is increased, so as to achieve the effect of controlling the display brightness of the first region to be lower than the display brightness of the second region.

In a possible embodiment of the present disclosure, the present disclosure further provides a display brightness recovery method, and a core idea is to adjust the display brightness of the first region after controlling the display brightness of the first region to be lower than the display brightness of the second region and the first region is displayed at the display brightness for a preset period. The specific adjustment method includes, but not limited to, any of the following.

Method 1: adjusting the display brightness of the first region to a preset brightness after determining that an operation in the first region is ended for a preset period.

During an implementation, the preset brightness is used to represent the default brightness set by the user, i.e., the brightness is displayed according to the preset brightness after the device is turned on.

Method 2: adjusting the display brightness of the first region to a display brightness of a previous display preset period after determining that an operation in the first region is ended for a preset period.

For example, the display brightness of the first region is L0; after controlling the display brightness of the first region to be lower than the display brightness of the second region, the display brightness of the first region is L1; and after the first region is displayed at L1 for 10 minutes, the display brightness of the first region is adjusted to L0.

Method 3: adjusting the display brightness of the first region to be the same as the display brightness of the second region after determining that an operation in the first region is ended for a preset period.

In a possible embodiment of the present disclosure, the preset brightness is determined through any one of the following.

Mode 1: receiving a user image shot by a camera, and determining the preset brightness in accordance with a pre-stored brightness requirement corresponding to the user image.

According to the mode 1, the intelligent interactive tablet is provided with a camera, and the corresponding brightness requirements are set and saved for different users in advance through a face recognition algorithm, so that when each user is detected, personalized brightness may be provided for different users.

Figure 7:
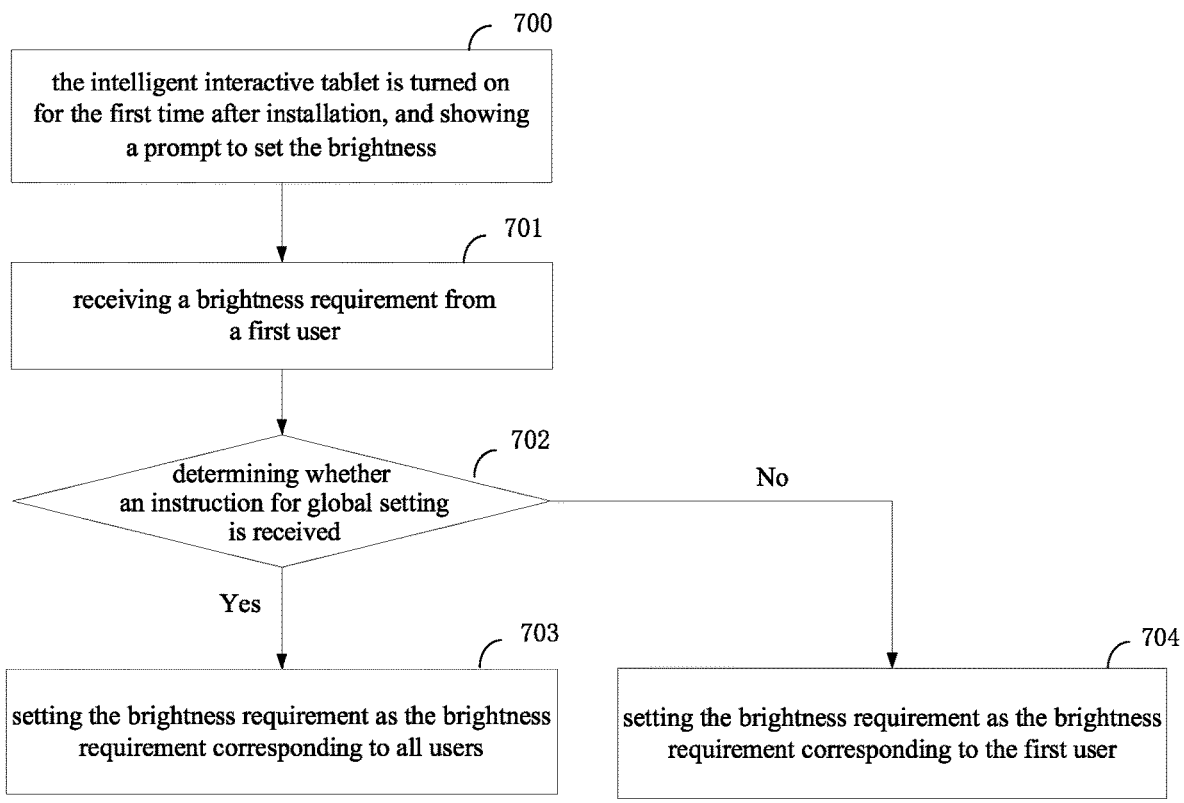
FIG. 7 is a flow chart of a personalized brightness arrangement method according to one embodiment of the present disclosure.

During an implementation, the intelligent interactive tablet is provided with a camera for shooting the user image; and the processor receives the user image shot by the camera and determines the preset brightness according to the brightness requirement corresponding to the user image. Different user images have different brightness requirements, and a more personalized brightness setting method may be provided. In a possible embodiment of the present disclosure, the face recognition algorithm may be used to store the display brightness of individual settings for users with specific brightness requirements, as shown in FIG. 7, and the specific process is as follows.

Step 700: the intelligent interactive tablet being turned on for the first time after installation, and showing a prompt to set the brightness.

Step 701: receiving a brightness requirement from a first user.

The brightness requirement includes, but not limited to, a specific brightness value or a method for adjusting brightness. The method for adjusting the brightness includes, but not limited to, the method for adjusting the brightness provided in the embodiments of the present disclosure, or a method for adjusting the brightness according to an ambient brightness measured by a light detection sensor.

Step 702: determining whether an instruction for global setting is received, if yes, executing step 703; otherwise, executing step 704.

Step 703: setting the brightness requirement as the brightness requirement corresponding to all users.

Step 704: setting the brightness requirement as the brightness requirement corresponding to the first user.

In a possible embodiment of the present disclosure, after the brightness requirements of a plurality of users are set through the above method, it is able to perform face recognition on the user image through the user image shot by the camera on the intelligent interactive tablet through the face recognition algorithm, and then determine the brightness requirement of the user corresponding to the user image according to a recognition result, so as to set the brightness of the intelligent interactive tablet.

Mode 2: in response to a brightness setting instruction of a user, determining the brightness corresponding to the brightness setting instruction as the preset brightness.

Mode 3: receiving the ambient brightness measured by the light detection sensor, and determining the preset brightness according to the pre-stored brightness corresponding to the ambient brightness.

In a possible embodiment of the present disclosure, a method for setting the display brightness with an eye protection mode is provided, which specifically includes, before the display brightness of the first region is controlled to be lower than the display brightness of the second region, receiving an eye protection instruction sent by a peripheral device in communication connection with the intelligent interactive tablet, and reducing the display brightness of the full screen of the display screen.

Base on the core idea of controlling the brightness of the first region to be low than the brightness of the second region, the display brightness of the intelligent interactive tablet is adaptively adjusted, it is able to make the user who operates at a short distance to have a more comfortable operating experience without affecting the users' watching experience from a long distance. The present disclosure provides a plurality of specific methods for adjusting the display brightness.

First Embodiment

Figure 8:
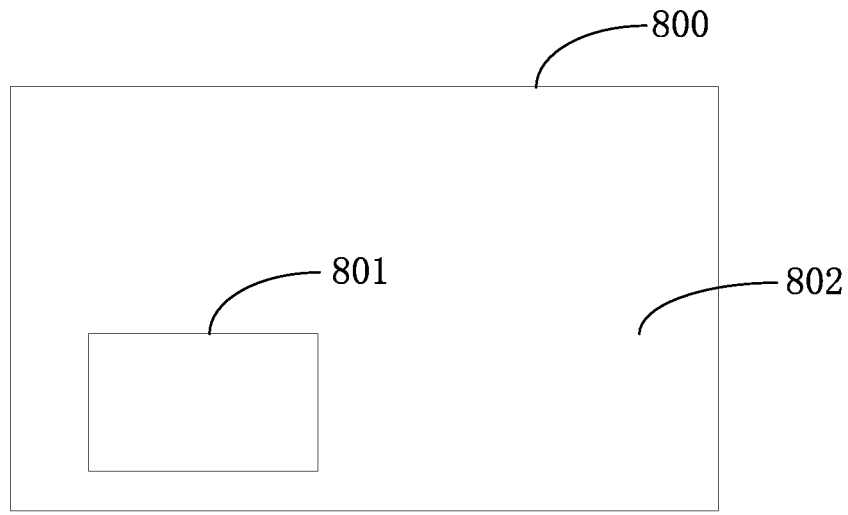
FIG. 8 is a schematic view of a position relationship of a display region according to one embodiment of the present disclosure.
Figure 9:
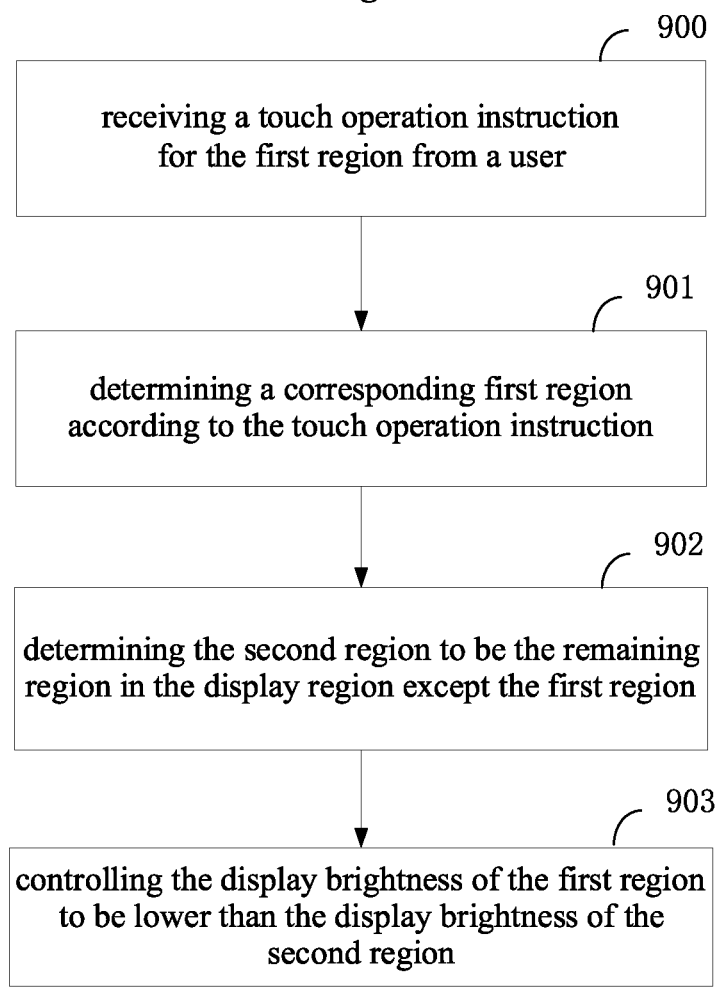
FIG. 9 is a flow chart of a method for adjusting brightness according to one embodiment of the present disclosure.

The position relationship among the display region 800, the first region 801, and the second region 802 is as shown in FIG. 8, and the display region 800 is formed by the combination of the first region 801 and the second region 802. As shown in FIG. 9, the first specific process of the method for adjusting brightness is as follows.

Step 900: receiving a touch operation instruction for the first region from a user.

During an implementation, the touch operation instruction is used to determine the first region, including a click operation on a shortcut button arranged on the touch pen, or an icon click operation on the touch screen, or a touch gesture.

The contents displayed in the first region include at least a part of the contents in the display region, for example, the first region copies the entire contents or at least the key elements from the display region, and the key elements include, but not limited to, a program icon, a tool icon of a certain program, and a stylus icon of handwriting software. In the specific implementation, the contents displayed in the display region are zoomed and shifted to the first region for display; or only the key contents are displayed, for example, a background image of the display region is omitted, and only the key program icons or tool icons are displayed.

Step 901: determining a corresponding first region according to the touch operation instruction.

Step 902: determining the second region to be the remaining region in the display region except the first region.

Step 903: controlling the display brightness of the first region to be lower than the display brightness of the second region.

During an implementation, the operation of the user in the first region may be mapped to a full screen, for example, the user performs a handwriting operation in the first region, the handwritten characters are displayed in the first region and the second region at the same time, and the characters displayed in the second region are displayed by amplifying the characters displayed in the first region in equal proportion.

In the embodiments of the present disclosure, the brightness adjustment is combined with the interactive control of the large-sized display screen. A conventional display screen with a size of 135 inch is difficult to interact with in full screen, and the size is relatively large. Therefore, it is able to perform operation or handwriting on the first region, and the operation instructions or handwriting may also be displayed on the second region.

In a possible embodiment of the present disclosure, a brightness adjustment option may also be displayed in the first region, so as to provide brightness adjustment settings for the user at a short distance. If the handwriting interface is currently displayed in the first region, the handwriting background in the first region may be directly set as a low-brightness background or a brightness adjustment option may be provided in the first region. If an operation interface such as a home page is displayed in the first region, in addition to displaying the operation icons, the background of home page may also be removed in the first region, and the size and simplicity of the operation icons may also be adjusted.

Second Embodiment

Figure 10:
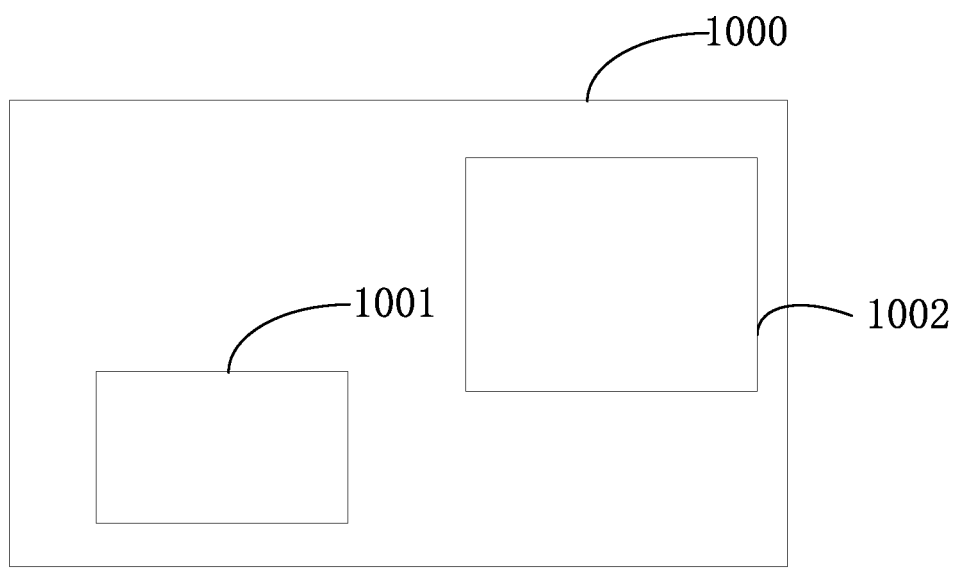
FIG. 10 is another schematic view of the position relationship of the display region according to one embodiment of the present disclosure.
Figure 11:
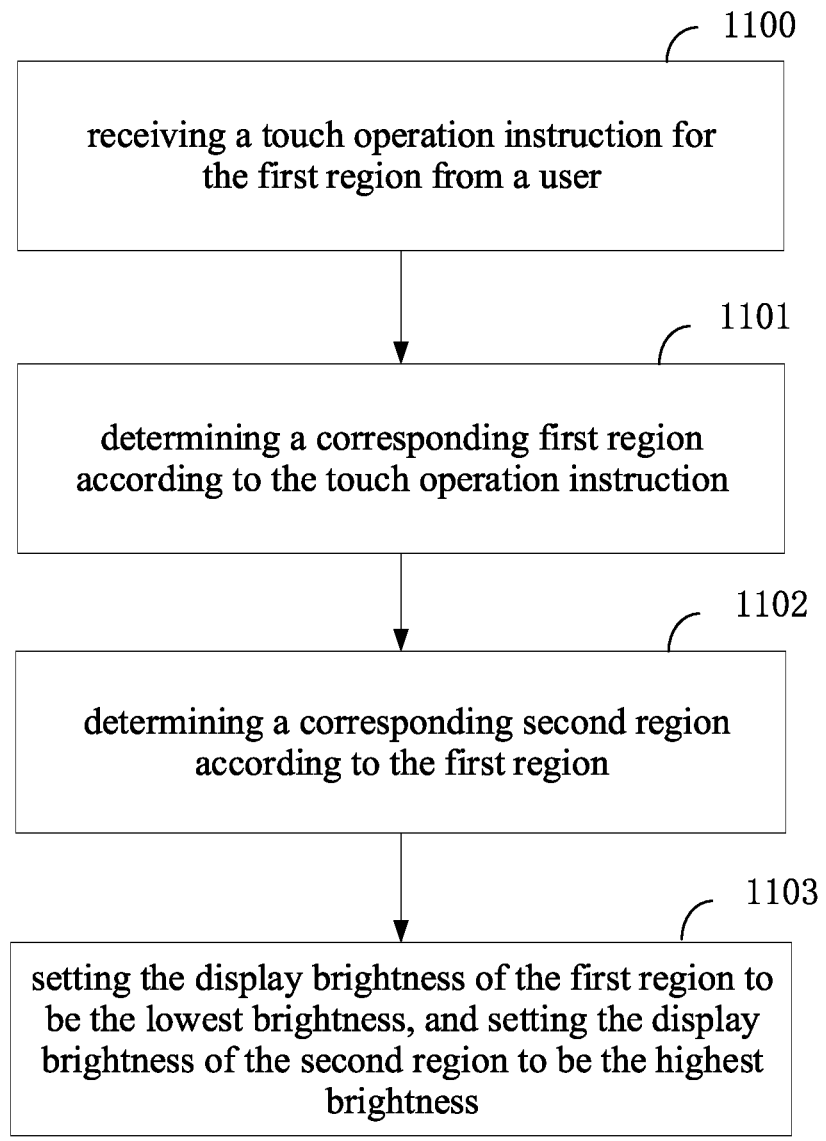
FIG. 11 is another flow chart of the method for adjusting brightness according to one embodiment of the present disclosure.

The position relationship among the display region 1000, the first region 1001, and the second region 1002 is as shown in FIG. 10, and the display region 1000 is formed by the combination of the first region 1001 and the second region 1002. As shown in FIG. 11, the first specific process of the method for adjusting brightness is as follows.

Step 1100: receiving a touch operation instruction for the first region from a user.

Step 1101: determining a corresponding first region according to the touch operation instruction.

Step 1102: determining a corresponding second region according to the first region.

Step 1103: controlling the display brightness of the first region to be the lowest brightness, and controlling the display brightness of the second region to be the highest brightness.

During an implementation, the second region is used to copy the contents in the first region, that is, the user's operation or writing in the first region may be copied to the second region. The second region may have a certain content cover other region, that is, the second region floats on the upper layer of the display region.

To be specific, the full screen may include three regions, the first region 1001 is a low-brightness region where the user operates; the second region 1002 is a high-brightness area where the contents completely copies the contents in the first region 1001, that is, the contents written by the user in the first region 1001 is synchronously displayed in the second region 1002; and the remaining region 1003 except the first region 1001 and the second region 1002 may take intermediate brightness.

In a possible embodiment of the present disclosure, after the user finishes writing, the contents in the second region 1002 disappear, only the first region 1001 is remained. During an implementation, an animation effect may be set, for example, the second region 1002 floats toward the first region 1001 until the two regions merge into one region.

In a possible embodiment of the present disclosure, contents displayed in the remaining region 1003 may be zoomed or shifted to ensure that the first region 1001 does not obscure existing display elements.

Third Embodiment

Figure 12:
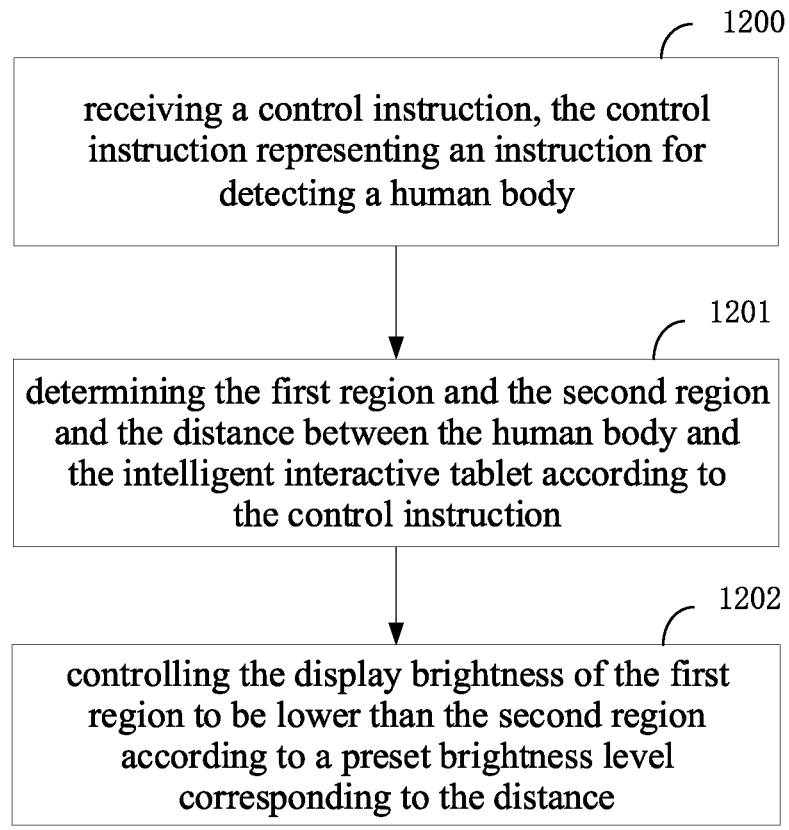
FIG. 12 is a flow chart of a method for adjusting display brightness according to one embodiment of the present disclosure.

The present disclosure provides a method for adjusting the display brightness according to the distance between the human body and the intelligent interactive tablet, as shown in FIG. 12, and the specific process of the method is as follows.

Step 1200: receiving a control instruction, and the control instruction being used to represent an instruction for detecting a human body.

The control instruction includes, but not limited to, one of the instruction for a proximity sensor, the instruction for a distance sensor and the touch operation instruction.

In the embodiments of the present disclosure, whether a human body approaches the intelligent interactive tablet may be determined through the control instruction, and position information about the human body relative to the intelligent interactive tablet may be determined according to the control instruction.

Step 1201: determining the first region and the second region and the distance between the human body and the intelligent interactive tablet according to the control instruction.

In the embodiments of the present disclosure, the distance between the human body and the intelligent interactive tablet may be determined in accordance with the received control instruction, so as to adjust the brightness of the intelligent interactive tablet according to the distance, and the specific brightness adjustment method is as follows.

Step 1202: controlling the display brightness of the first region to be lower than the display brightness of the second region according to a preset brightness level corresponding to the distance.

In a possible embodiment of the present disclosure, the display brightness of the first region of the intelligent interactive tablet is controlled to decrease as the distance decreases.

In the embodiments of the present disclosure, a plurality of brightness levels is preset, so that the brightness of the intelligent interactive tablet may be adjusted according to the brightness levels. During an implementation, the higher the brightness level is, the higher the corresponding brightness is, or the lower the brightness level is, the higher the corresponding brightness is, which will not be particularly defined herein.

In the embodiments of the present disclosure, the brightness level corresponds to the distance between the human body and the intelligent interactive tablet. As the distance becomes smaller, the brightness level of the first region decreases, and the display brightness of the first region decreases; in some embodiments of the present disclosure, as the distance becomes smaller, the brightness level of the second region increases, and the display brightness of the second region increases; in some embodiments of the present disclosure, as the distance becomes smaller, the display brightness of the first region decreases and the display brightness of the second region increases.

In a possible embodiment of the present disclosure, the brightness level corresponds to a distance interval to which the distance between the human body and the intelligent interactive tablet belongs. The display brightness of the first region is controlled to be lower than the display brightness of the second region according to the brightness level corresponding to the distance interval to which the distance belongs. In a possible embodiment of the present disclosure, a specifically three-level dimming scheme is provided, and includes the following dimming schemes.

Scheme 12a: if the distance is not less than the viewing threshold, the display brightness of the first region is controlled to be the same as the display brightness of the second region.

Optionally, the display brightness of the first region and the second region is controlled to be a preset brightness. The viewing threshold is used to represent that the distance between the human body and the intelligent interactive tablet is a long distance, and is suitable for the brightness value watching from a long distance. Optionally, if the distance between the human body and the intelligent interactive tablet is a long distance, the brightness of the intelligent interactive tablet may be adjusted to the preset brightness. The preset brightness may be the brightness preset by the user, or the brightness corresponding to the current environment obtained by automatic adjustment of the light detection sensor in the art. A plurality of methods for determining the preset brightness is illustrated, which will not be particularly defined herein.

Scheme 12b: if the distance is greater than the operation threshold and less than the viewing threshold, controlling the display brightness of the first region is to be a first level brightness and the display brightness of the second region to be the preset brightness.

The first level brightness is lower than the preset brightness, i.e., the brightness of the first region of the intelligent interactive tablet is controlled to be lower than the brightness of the second region.

Scheme 12c: if the distance is not greater than the operation threshold, controlling the display brightness of the first region to be a second level brightness, and the display brightness of the second region controlled to be the preset brightness.

The second level brightness is lower than the first level brightness.

In the embodiments of the present disclosure, it is able to detect whether a human body approaches the intelligent interactive tablet in real time through the proximity sensor or the distance sensor which is arranged inside or outside the intelligent interactive tablet, and feedback the received real-time instruction to a driving circuit of the intelligent interactive tablet. When the front side of the intelligent interactive tablet is approached by a person, the judgment is carried out according to the received feedback from the proximity sensor. When a straight-line distance S between the human body and the intelligent interactive tablet is set to be $S2<S<S1$, it is determined that the user requires use the intelligent interactive tablet at a short-distance, the display brightness of the first region is reduced to L1 through the driving circuit, and the display brightness of the second region is set to L0, where L0 is the preset brightness, and $L1<L0$. When the straight-line distance S between the human body and the intelligent interactive tablet is $S<=S2$, it is determined that the user has a writing requirement, the display brightness of the first region is reduced to L2 through the driving circuit, and the display brightness of the second region is set to L0, where $L2<L1$.

In a possible embodiment of the present disclosure, after the first region is controlled to display at the display brightness for a preset period, the display brightness of the first region is adjusted again according to the display brightness corresponding to the distance. For example, after the first region displays at the display brightness for a preset period and it is determined that the distance between the current human body and the intelligent interactive tablet is $S>=S1$, the brightness of the first region is restored to L0.

To sum up, according to the method for adjusting the intelligent interactive tablet in the embodiments of the present disclosure, it is able to effectively control the display brightness of a region where the user operates on the intelligent interactive tablet to be lower than the display brightness of other regions, and provide a plurality of methods for determining the first region and the second region and a plurality of methods for controlling the display brightness, so as to improve use's experience when the user uses the intelligent interactive tablet at a short distance, without affecting watching experience of the users from a long distance.

Figure 13:
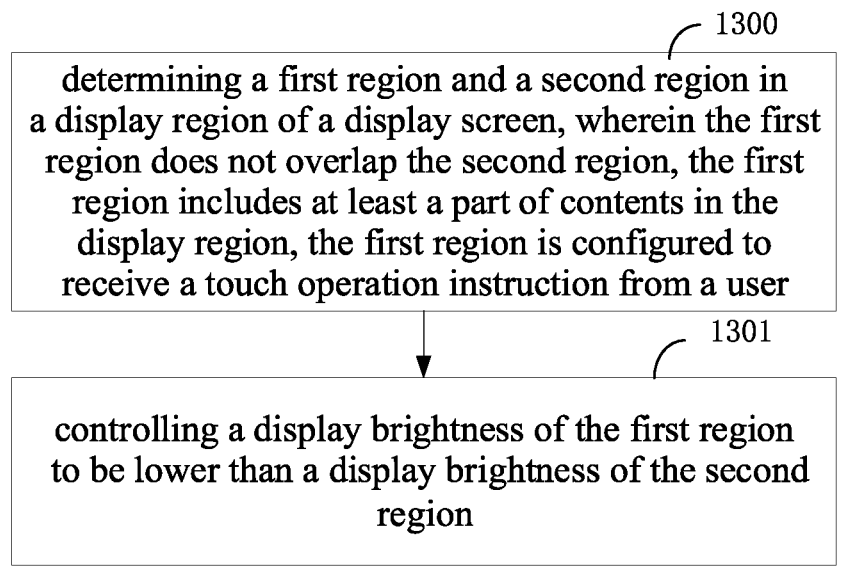
FIG. 13 is a flow chart of a method for adjusting a brightness of an intelligent interactive tablet according to one embodiment of the present disclosure.

In a possible embodiment of the present disclosure, the present disclosure further provides in some embodiments a method for adjusting a brightness of an intelligent interactive tablet, as shown in FIG. 13, which includes the following steps.

Step 1300: determining a first region and a second region in a display region of a display screen. A position of the first region does not overlap a position of the second region, the first region includes at least a part of contents in the display region, the first region is configured to receive a touch operation instruction from a user, and the position of the first region does not overlap the position of the second region.

Step 1301: controlling a display brightness of the first region to be lower than a display brightness of the second region.

In a possible embodiment of the present disclosure, the method further includes receiving a touch operation instruction for the first region; and converting the touch operation instruction for the first region into a touch operation instruction for controlling the second region.

In a possible embodiment of the present disclosure, at least a part of contents in the display region displayed in the first region includes contents in the second region.

In a possible embodiment of the present disclosure, the first region includes an icon of the second region, the receiving a touch operation instruction for the first region and converting the touch operation instruction for the first region into a touch operation instruction for controlling the second region, includes displaying a first icon in the second region; displaying a second icon associated with the first icon in the first region; receiving a first touch operation instruction for the second icon in the first region; and converting the first touch operation instruction for the second icon in the first region into a second touch operation instruction for controlling the first icon in the second region; and further includes receiving a touch operation instruction for the icon in the first region; and converting the touch operation instruction for the icon in the first region into a touch operation instruction for controlling the icon in the second region.

In a possible embodiment of the present disclosure, subsequent to determining the first region and the second region in the display region of the display screen, the method further includes: copying at least a part of the contents in the first region to the second region for display.

In a possible embodiment of the present disclosure, the copying at least a part of the contents in the first region to the second region for display, includes receiving a writing instruction from the first region, and generating handwriting in the first region in accordance with the writing instruction; and copying the handwriting generated in the first region to the second region for display, and copying the handwriting in the first region to the second region for display.

In a possible embodiment of the present disclosure, subsequent to copying at least a part of the contents in the first region to the second region for display, the method further includes determining that the writing instruction from the first region is ended, and removing contents of the copied handwriting in the first region from the second region.

In a possible embodiment of the present disclosure, the second region is a remaining region in the display region except the first region; or the second region is a part of the remaining region in the display region except the first region.

In a possible embodiment of the present disclosure, subsequent to determining the first region and the second region in the display region of the display screen, the method further includes: copying the at least a part of the contents in the display region to the second region for display.

In a possible embodiment of the present disclosure, the display brightness of the second region is greater than a display brightness of other regions in the display region.

In a possible embodiment of the present disclosure, the display region further includes a third region, the display brightness of the second region is greater than a display brightness of the third region, and the display brightness of the third region is greater than the display brightness of the first region.

In a possible embodiment of the present disclosure, subsequent to controlling the display brightness of the first region to be lower than the display brightness of the second region, the method further includes: adjusting the display brightness of the first region to a preset brightness after determining that an operation in the first region is ended for a preset period; or adjusting the display brightness of the first region to a display brightness of a previous display preset period after determining that an operation in the first region is ended for a preset period; or adjusting the display brightness of the first region to be the same as the display brightness of the second region after determining that an operation in the first region is ended for a preset period.

In a possible embodiment of the present disclosure, prior to determining the first region and the second region in the display region of the display screen, the method further includes: receiving a control instruction to reduce a display brightness of a full screen of the display screen.

In a possible embodiment of the present disclosure, the controlling the display brightness of the first region to be lower than the display brightness of the second region, includes receiving the touch operation instruction for the first region to increase the display brightness of the second region.

In a possible embodiment of the present disclosure, the determining the first region in the display region of the display screen, includes determining the first region in accordance with a predetermined position of the first region; or determining the first region corresponding to a control instruction in accordance with the received control instruction.

In a possible embodiment of the present disclosure, the determining the first region corresponding to the control instruction in accordance with the received control instruction, includes if the control instruction is a received touch operation instruction for controlling the first region, determining the first region in accordance with a position of the touch operation instruction in the display region; or if the control instruction is an instruction for detecting a human body position, determining the first region in accordance with the human body position.

In a possible embodiment of the present disclosure, the display brightness of the first region decreases as a distance between the human body position and the intelligent interactive tablet decreases.

In a possible embodiment of the present disclosure, the display brightness of the first region decreasing as the distance between the human body position and the intelligent interactive tablet decreases, includes if the distance between the human body position and the intelligent interactive tablet is greater than an operation threshold and less than a viewing threshold, determining the display brightness of the first region to be a first level brightness, and the operation threshold being less than the viewing threshold; and if the distance between the human body position and the intelligent interactive tablet is less than or equal to the operation threshold, controlling the display brightness of the first region to be lower than the first level brightness.

In a possible embodiment of the present disclosure, an area of the first region decreases as the distance between the human body position and the intelligent interactive tablet decreases.

In a possible embodiment of the present disclosure, the determining the first region in accordance with the position of the touch operation instruction in the display region, includes if the touch operation instruction is a click operation instruction, obtaining a time difference between adjacent click operation instructions, and if the time difference is less than a continuous click threshold, determining the first region in accordance with a position of a latest received click operation instruction in the display region; or if the touch operation instruction is the writing instruction, determining the first region in accordance with a position of the writing instruction in the display region.

In a possible embodiment of the present disclosure, the determining the first region in accordance with the position of the touch operation instruction in the display region, includes determining a region within a preset range as the first region with the position of the touch operation instruction in the display region as a center; or determining a circular region with a radius of view as a radius as the first region with the position of the touch operation instruction in the display region as a center, and the radius of view being determined in accordance with a distance between the user sending the touch operation instruction and the intelligent interactive tablet.

In a possible embodiment of the present disclosure, the determining the first region in accordance with the human body position includes determining a center of a region corresponding to the human body position in the display region in accordance with the human body position, and determining the first region in accordance with the center of the region.

In a possible embodiment of the present disclosure, the determining the second region in the display region of the display screen, includes determining the second region in accordance with a predetermined position of the second region; or determining the second region corresponding to a control instruction in accordance with the received control instruction; or determining the second region corresponding to the first region in accordance with the first region.

In a possible embodiment of the present disclosure, the control instruction include at least one of the following: the touch operation instruction; an instruction for a proximity sensor; an instruction for a distance sensor; an instruction for a Bluetooth receiver; an instruction for a hotspot receiver; an instruction for a WI-FI receiver; and an instruction for a peripheral device in communication connection with the intelligent interactive tablet.

Based on the same concept, the present disclosure provides in some embodiments a brightness adjustment device for an intelligent interactive tablet. The brightness adjustment device is a device in accordance with the method in the embodiments of the present disclosure, and the principle of the device for solving problems is similar to that of the method, so the embodiments about the device may be referred to the embodiments about method, and thus will not be particularly defined herein.

Figure 14:
FIG. 14 is a schematic view of a brightness adjustment device for the intelligent interactive tablet according to one embodiment of the present disclosure.

As shown in FIG. 14, the brightness adjustment device includes a determination unit 1400 and a control unit 1401.

The determination unit 1400 is configured to determine a first region and a second region in a display region of a display screen, a position of the first region does not overlap a position of the second region, the first region includes at least a part of contents in the display region, the first region is configured to receive a touch operation instruction from a user, and the position of the first region does not overlap the position of the second region.

The control unit 1401 is configured to control a display brightness of the first region to be lower than a display brightness of the second region.

In a possible embodiment of the present disclosure, the brightness adjustment device further includes a receiving control unit, specifically configured to receive a touch operation instruction for the first region; and convert the touch operation instruction for the first region into a touch operation instruction for controlling the second region.

In a possible embodiment of the present disclosure, at least a part of contents in the display region displayed in the first region includes contents in the second region.

In a possible embodiment of the present disclosure, the first region includes an icon of the second region, the receiving control unit is specifically configured to display a first icon in the second region; display a second icon associated with the first icon in the first region; receive a first touch operation instruction for the second icon in the first region; and convert the first touch operation instruction for the second icon in the first region into a second touch operation instruction for controlling the first icon in the second region; and further configured to receive a touch operation instruction for the icon in the first region; and convert the touch operation instruction for the icon in the first region into a touch operation instruction for controlling the icon in the second region.

In a possible embodiment of the present disclosure, subsequent to determining the first region and the second region in the display region of the display screen, the brightness adjustment device further includes a first copy unit, specifically configured to copy at least a part of the contents in the first region to the second region for display.

In a possible embodiment of the present disclosure, the first copy unit is specifically configured to receive a writing instruction from the first region, and generate handwriting in the first region in accordance with the writing instruction; and copy the handwriting generated in the first region to the second region for display, and copy the handwriting in the first region to the second region for display.

In a possible embodiment of the present disclosure, subsequent to copying at least a part of the contents in the first region to the second region for display, the brightness adjustment device further includes a removing unit, specifically configured to determine that the writing instruction from the first region is ended, and remove contents of the copied handwriting in the first region from the second region.

In a possible embodiment of the present disclosure, the second region is a remaining region in the display region except the first region; or the second region is a part of the remaining region in the display region except the first region.

In a possible embodiment of the present disclosure, subsequent to determining the first region and the second region in the display region of the display screen, the brightness adjustment device further includes a second copy unit, specifically configured to copy the at least a part of the contents in the display region to the second region for display.

In a possible embodiment of the present disclosure, the display brightness of the second region is greater than a display brightness of other regions in the display region.

In a possible embodiment of the present disclosure, the display region further includes a third region, the display brightness of the second region is greater than a display brightness of the third region, and the display brightness of the third region is greater than the display brightness of the first region.

In a possible embodiment of the present disclosure, subsequent to controlling the display brightness of the first region to be lower than the display brightness of the second region, the brightness adjustment device further includes a recovery unit, specifically configured to adjust the display brightness of the first region to a preset brightness after determining that an operation in the first region is ended for a preset period; or adjust the display brightness of the first region to a display brightness of a previous display preset period after determining that an operation in the first region is ended for a preset period; or adjust the display brightness of the first region to be the same as the display brightness of the second region after determining that an operation in the first region is ended for a preset period.

In a possible embodiment of the present disclosure, prior to determining the first region and the second region in the display region of the display screen, the control unit is specifically configured to receive a control instruction to reduce a display brightness of a full screen of the display screen.

In a possible embodiment of the present disclosure, the control unit is specifically configured to receive the touch operation instruction for the first region to increase the display brightness of the second region.

In a possible embodiment of the present disclosure, the determination unit is specifically configured to determine the first region in accordance with a predetermined position of the first region; or determine the first region corresponding to a control instruction in accordance with the received control instruction.

In a possible embodiment of the present disclosure, the determination unit is specifically configured to: if the control instruction is a received touch operation instruction for controlling the first region, determine the first region in accordance with a position of the touch operation instruction in the display region; or if the control instruction is an instruction for detecting a human body position, determine the first region in accordance with the human body position.

In a possible embodiment of the present disclosure, the display brightness of the first region decreases as a distance between the human body position and the intelligent interactive tablet decreases.

In a possible embodiment of the present disclosure, the control unit is specifically configured to if the distance between the human body position and the intelligent interactive tablet is greater than an operation threshold and less than a viewing threshold, determine the display brightness of the first region to be a first level brightness, and the operation threshold being less than the viewing threshold; and if the distance between the human body position and the intelligent interactive tablet is less than or equal to the operation threshold, control the display brightness of the first region to be lower than the first level brightness.

In a possible embodiment of the present disclosure, an area of the first region decreases as the distance between the human body position and the intelligent interactive tablet decreases.

In a possible embodiment of the present disclosure, the determination unit is specifically configured to: if the touch operation instruction is a click operation instruction, obtain a time difference between adjacent click operation instructions, and if the time difference is less than a continuous click threshold, determine the first region in accordance with a position of a latest received click operation instruction in the display region; or if the touch operation instruction is the writing instruction, determine the first region in accordance with a position of the writing instruction in the display region.

In a possible embodiment of the present disclosure, the determination unit is specifically configured to: determine a region within a preset range as the first region with the position of the touch operation instruction in the display region as a center; or determine a circular region with a radius of view as a radius as the first region with the position of the touch operation instruction in the display region as a center, and the radius of view being determined in accordance with a distance between the user sending the touch operation instruction and the intelligent interactive tablet.

In a possible embodiment of the present disclosure, the determination unit is specifically configured to: determine a center of a region corresponding to the human body position in the display region in accordance with the human body position, and determine the first region in accordance with the center of the region.

In a possible embodiment of the present disclosure, the determination unit is specifically configured to: determine the second region in accordance with a predetermined position of the second region; or determine the second region corresponding to a control instruction in accordance with a received control instruction; or determine the second region corresponding to the first region in accordance with the first region.

In a possible embodiment of the present disclosure, the control instruction includes at least one of the following: the touch operation instruction; an instruction for a proximity sensor; an instruction for a distance sensor; an instruction for a Bluetooth receiver; an instruction for a hotspot receiver; an instruction for a WI-FI receiver; and an instruction for a peripheral device in communication connection with the intelligent interactive tablet.

Based on the same concept, the present disclosure further provides in some embodiments a computer storage medium storing therein a computer program, and the computer program is executed by a processor to implement: determining a first region and a second region in a display region of a display screen, wherein a position of the first region does not overlap a position of the second region, the first region includes at least a part of contents in the display region, the first region is configured to receive a touch operation instruction from a user, and the position of the first region does not overlap the position of the second region; and controlling a display brightness of the first region to be lower than a display brightness of the second region.

For a person skilled in the art, the embodiments of the present disclosure may be provided as methods, systems, or computer program products. Accordingly, the present disclosure may take the form of an entirely hardware embodiment, an entirely software embodiment or an embodiment combining software and hardware. The present disclosure may take the form of a computer program product implemented on one or more computer-usable storage media (including, but not limited to, magnetic disk storage, or optical storage) including computer-usable program code.

The present disclosure is described with reference to flow chart illustrations and/or block diagrams of methods, apparatus (systems), and computer program products in accordance with the embodiments of the present disclosure. It should be understood that, each flow and/or block of the flow chart illustrations and/or block diagrams, and combinations of flows and/or blocks in the flow chart illustrations and/or block diagrams, may be implemented by computer program instruction. The computer program instruction may be provided to a processor of a general purpose computer, a special purpose computer, an embedded processor, or other programmable data processing apparatus to produce a machine, such that the instruction executed by the processor of the computer or other programmable data processing apparatus, create means for implementing the functions specified in one or more processes of the flow chart and/or in one or more processes of the block diagram.

The computer program instruction may also be stored in a computer-readable storage that may direct a computer or other programmable data processing apparatus to function in a particular manner, such that the instruction stored in the computer-readable storage produce an article of manufacture including instruction devices, the instruction devices implement the functions specified in one or more processes of the flow chart and/or in one or more processes of the block diagram.

The computer program instruction may also be loaded onto a computer or other programmable data processing apparatus to cause a series of operational steps to be performed on the computer or other programmable apparatus to produce a computer implemented process, such that the instruction executed on the computer or other programmable apparatus provide steps for implementing the functions specified in one or more processes of the flow chart and/or in one or more processes of the block diagram.

Although preferred embodiments of the present disclosure have been described, a person skilled in the art may make additional changes and modifications to these embodiments once learning the basic creative concepts. Therefore, the attached claims are intended to be interpreted as including preferred embodiments and all changes and modifications falling within the scope of the present disclosure.

Obviously, a person skilled in the art may make further modifications and improvements without departing from the spirit and scope of the present disclosure. In this way, these modifications and improvements are also intended to be encompassed by the disclosure if they fall within the scope of the claims of the present disclosure and equivalents thereof.

What is claimed is:

1. An intelligent interactive tablet, comprising a display screen, a touch component and a driving circuit, wherein
   the display screen is configured to display contents;
   the touch component is configured to receive a touch operation instruction; and
   the driving circuit comprises a processor and a memory, the memory is configured to store a program executable by the processor, and the processor is configured to read the program stored in the memory and execute the following steps:
   determining a first region and a second region in a display region of the display screen, wherein a position of the first region does not overlap a position of the second region, contents displayed in the first region comprise at least a part of contents in the display region, and the first region is configured to receive the touch operation instruction from a user; and
   controlling a display brightness of the first region to be lower than a display brightness of the second region;
   wherein the processor is further configured to execute:
   receiving a touch operation instruction for the first region; and
   converting the touch operation instruction for the first region into a touch operation instruction for controlling the second region;
   wherein the processor of the intelligent interactive tablet is used to divide the display screen into the first region and the second region through algorithms or software;
   wherein prior to determining the first region and the second region in the display region of the display screen, the processor is further configured to execute:
   receiving a control instruction to reduce a display brightness of a full screen of the display screen; and
   receiving the touch operation instruction for the first region to increase the display brightness of the second region.

2. The intelligent interactive tablet according to claim 1, wherein the contents displayed in the first region comprise contents in the second region.

3. The intelligent interactive tablet according to claim 1, wherein the processor is specifically configured to execute:
   displaying a first icon in the second region;
   displaying a second icon associated with the first icon in the first region;
   receiving a first touch operation instruction for the second icon in the first region; and
   converting the first touch operation instruction for the second icon in the first region into a second touch operation instruction for controlling the first icon in the second region.

4. The intelligent interactive tablet according to claim 1, wherein the processor is further specifically configured to execute:
   copying at least a part of the contents in the first region to the second region for display.

5. The intelligent interactive tablet according to claim 4, wherein the processor is specifically configured to execute:
   receiving a writing instruction from the first region, and generating handwriting in the first region in accordance with the writing instruction; and
   copying the handwriting generated in the first region to the second region for display.

6. The intelligent interactive tablet according to claim 5, wherein subsequent to copying at least a part of the contents in the first region to the second region for display, the processor is further specifically configured to execute:
   determining that the writing instruction from the first region is ended, and removing contents of the copied handwriting in the first region from the second region.

7. The intelligent interactive tablet according to claim 1, wherein the second region is a remaining region in the display region except the first region; or
   the second region is a part of the remaining region in the display region except the first region.

8. The intelligent interactive tablet according to claim 1, wherein the processor is further specifically configured to execute:
   copying the at least a part of the contents in the display region to the second region for display.

9. The intelligent interactive tablet according to claim 1, wherein the display brightness of the second region is greater than a display brightness of other regions in the display region.

10. The intelligent interactive tablet according to claim 9, wherein the display region further comprises a third region, the display brightness of the second region is greater than a display brightness of the third region, and the display brightness of the third region is greater than the display brightness of the first region.

11. The intelligent interactive tablet according to claim 1, wherein subsequent to controlling the display brightness of the first region to be lower than the display brightness of the second region, the processor is further specifically configured to execute:
   adjusting the display brightness of the first region to a preset brightness after determining that an operation in the first region is ended for a preset period; or
   adjusting the display brightness of the first region to a display brightness of a previous display preset period after determining that an operation in the first region is ended for a preset period; or
   adjusting the display brightness of the first region to be the same as the display brightness of the second region after determining that an operation in the first region is ended for a preset period.

12. The intelligent interactive tablet according to claim 1, wherein the processor is specifically configured to execute:
   determining the first region in accordance with a predetermined position of the first region; or
   determining the first region corresponding to a control instruction in accordance with the received control instruction.

13. The intelligent interactive tablet according to claim 12, wherein the processor is specifically configured to execute:
   if the control instruction is a received touch operation instruction for controlling the first region, determining the first region in accordance with a position of the touch operation instruction in the display region; or
   if the control instruction is an instruction for detecting a human body position, determining the first region in accordance with the human body position.

14. The intelligent interactive tablet according to claim 13, wherein the display brightness of the first region decreases as a distance between the human body position and the intelligent interactive tablet decreases.

15. The intelligent interactive tablet according to claim 14, wherein the processor is specifically configured to execute:
   if the distance between the human body position and the intelligent interactive tablet is greater than an operation threshold and less than a viewing threshold, determining the display brightness of the first region to be a first level brightness, and the operation threshold being less than the viewing threshold; and
   if the distance between the human body position and the intelligent interactive tablet is less than or equal to the operation threshold, controlling the display brightness of the first region to be lower than the first level brightness.

16. The intelligent interactive tablet according to claim 13, wherein the processor is specifically configured to execute:
   determining a center of a region corresponding to the human body position in the display region in accordance with the human body position, and determining the first region in accordance with the center of the region.

17. The intelligent interactive tablet according to claim 1, wherein the processor is specifically configured to execute:
   determining the second region in accordance with a predetermined position of the second region; or
   determining the second region corresponding to a control instruction in accordance with the received control instruction; or
   determining the second region corresponding to the first region in accordance with the first region.

18. A method for adjusting a brightness of an intelligent interactive tablet, comprising:
   determining a first region and a second region in a display region of a display screen, wherein a position of the first region does not overlap a position of the second region, the first region comprises at least a part of contents in the display region, and the first region is configured to receive a touch operation instruction from a user, wherein the division of the first region and the second region is based on software or algorithms; and
   controlling a display brightness of the first region to be lower than a display brightness of the second region;
   wherein the method further comprises:
   receiving a touch operation instruction for the first region; and
   converting the touch operation instruction for the first region into a touch operation instruction for controlling the second region;
   wherein prior to determining the first region and the second region in the display region of the display screen, the method further comprises:
   receiving a control instruction to reduce a display brightness of a full screen of the display screen; and
   receiving the touch operation instruction for the first region to increase the display brightness of the second region.

19. A computer storage medium storing therein a computer program, wherein the computer program is executed by a processor so as to implement the steps in the method according to claim 18.

* * * * *